US012741882B2

(12) United States Patent
Corkery et al.

(10) Patent No.: US 12,741,882 B2
(45) Date of Patent: Sep. 22, 2026

(54) MANUFACTURE OF TITANIUM DIOXIDE STRUCTURES

(71) Applicant: TIOTECH AS, Nyborg (NO)

(72) Inventors: Robert Corkery, Stockholm (SE); Andreas Westermoen, Frekhaug (NO); Anders Teigland, Bergen (NO); Hjørdis Skår, Bergen (NO); Andre Marcel Bienfait, Ulset (NO)

(73) Assignee: TIOTECH AS, Nyborg (NO)

( * ) Notice: Subject to any disclaimer, the term of this patent is extended or adjusted under 35 U.S.C. 154(b) by 944 days.

(21) Appl. No.: 17/429,829

(22) PCT Filed: Feb. 14, 2020

(86) PCT No.: PCT/EP2020/053922

§ 371 (c)(1),
(2) Date: Aug. 10, 2021

(87) PCT Pub. No.: WO2020/165419

PCT Pub. Date: Aug. 20, 2020

(65) Prior Publication Data

US 2022/0119272 A1 Apr. 21, 2022

(30) Foreign Application Priority Data

Feb. 15, 2019 (SE) .................................. 1950193-1
Feb. 15, 2019 (SE) .................................. 1950194-9

(51) Int. Cl.
*C01G 23/08* (2006.01)
*H01M 10/0525* (2010.01)
(Continued)

(52) U.S. Cl.
CPC ........ *C01G 23/08* (2013.01); *H01M 10/0525* (2013.01); *B82Y 30/00* (2013.01);
(Continued)

(58) Field of Classification Search
None
See application file for complete search history.

(56) References Cited

U.S. PATENT DOCUMENTS 5,389,361 A 2/1995 Osterried et al.
5,698,205 A 12/1997 Brückner et al.
(Continued)

FOREIGN PATENT DOCUMENTS

CN 1915835 A 2/2007
CN 101827650 A 9/2010
(Continued)

OTHER PUBLICATIONS

Burkel et al. (Applied Catalysis A: General 500 (2015), 40-50 (Year: 2015).*
(Continued)

*Primary Examiner* — Yun Qian
(74) *Attorney, Agent, or Firm* — Porter Wright Morris & Arthur LLP

(57) ABSTRACT

The present invention relates to a method for manufacturing a structure of a titanium compound selected from the group consisting of sheets, wires and tubes. The present invention also relates to intermediate products and structures comprising titanium dioxide obtainable by the method. The invention provides an improved method giving improved yield as well as other advantages.

12 Claims, 11 Drawing Sheets

(51) Int. Cl.
*B82Y 30/00* (2011.01)
*B82Y 40/00* (2011.01)

(52) U.S. Cl.
CPC ........... *B82Y 40/00* (2013.01); *C01P 2004/13* (2013.01); *C01P 2004/16* (2013.01); *C01P 2006/12* (2013.01)

(56) References Cited

U.S. PATENT DOCUMENTS

| | | | |
|---|---|---|---|
| 7,820,724 | B2 | 10/2010 | Fu et al. |
| 7,932,208 | B2 | 4/2011 | Fu et al. |
| 8,652,351 | B2 | 2/2014 | Sotokawa et al. |
| 9,972,839 | B2 | 5/2018 | Song et al. |
| 11,565,944 | B2 | 1/2023 | Li et al. |
| 2006/0264520 | A1 | 11/2006 | Sonezaki et al. |
| 2012/0077074 | A1 | 3/2012 | Hoshina et al. |
| 2016/0207789 | A1 | 7/2016 | Tang et al. |
| 2018/0261838 | A1 | 9/2018 | Capiglia et al. |

FOREIGN PATENT DOCUMENTS

| | | | |
|---|---|---|---|
| CN | 101842923 | A | 9/2010 |
| CN | 101980782 | A | 2/2011 |
| CN | 103693681 | A | 4/2014 |
| CN | 109264774 | A | 1/2019 |
| EP | 2184797 | A1 | 5/2010 |
| EP | 3049371 | A1 | 8/2016 |
| JP | 2001-206720 | A | 7/2001 |
| JP | 2008-247712 | A | 10/2008 |
| JP | 2012-211030 | A | 11/2012 |
| JP | 2013-203577 | A | 10/2013 |
| JP | 2016-531839 | A | 10/2016 |
| JP | 2016-192341 | A | 11/2016 |
| KR | 2008-0057102 | A | 6/2008 |
| WO | 2008/014690 | A1 | 2/2008 |
| WO | 2014/118372 | A1 | 8/2014 |
| WO | 2015/038076 | A1 | 3/2015 |

OTHER PUBLICATIONS

CN 1915835 A, applicant submitted in IDS; Machine-generated English translation.*

Wu, Shuilin et al., Functionalized TiO2 Based Nanomaterials for Biomedical Applications, Adv. Funct. Mater., vol. 24, No. 35, pp. 5464-5481 (2014).

Hu, Anzheng et al., TiO2 nanorods branched on fast-synthesized large clearance TiO2 nanotube arrays for dye-sensitive solar cells, Journal of Solid State Chemistry, vol. 184, No. 11, pp. 2936-2940 (2011).

Lee, Kiyoung et al., One-Dimensional Titanium Dioxide Nanomaterials: Nanotubes, Chem. Rev., vol. 114, No. 19,pp. 9385-9454 (2014).

Xia, X.H. et al., Synthesis and photocatalytic properties properties of TiO2 nanostructures, Materials Research Bulletin, vol. 43, No. 8-9, pp. 2187-2195 (2008).

Dhage, S.R. et al., Synthesis of ultrafine TiO2 by citrate gel method, Materials Research Bulletin, vol. 38, No. 11-12, pp. 1623-1628 (2003).

Kang, Tae-Sik et al., Fabrication of Highly-Ordered TiO2 Nanotube Arrays and Their Use in Dye-Sensitized Solar Cells, Nano Letters, vol. 9, No. 2, pp. 601-606 (2009).

Asagoe, K et al., TiO2-Anatase Nanowire Dispersed Composite Electrode for Dye-Sensitized Solar Cells, Journal of Physics: Conference Series, vol. 61, No. 1, pp. 1112-1116 (2007).

Intelligent Materials Pvt. Ltd., Specification Sheet, Degussa p25 Titanium Dioxide Nanopowder (TiO2, Rutile: Anatase/85:15, 99.9%, 20nm) Stock No. NS6130-03-351, Cas: 13463-67-7, Nanoshel LLC, pp. 1-2 (Undated).

Office Action from corresponding Chinese Application No. 2020800144105 dated Feb. 23, 2023 with English Translation.

* cited by examiner

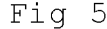
Fig 5
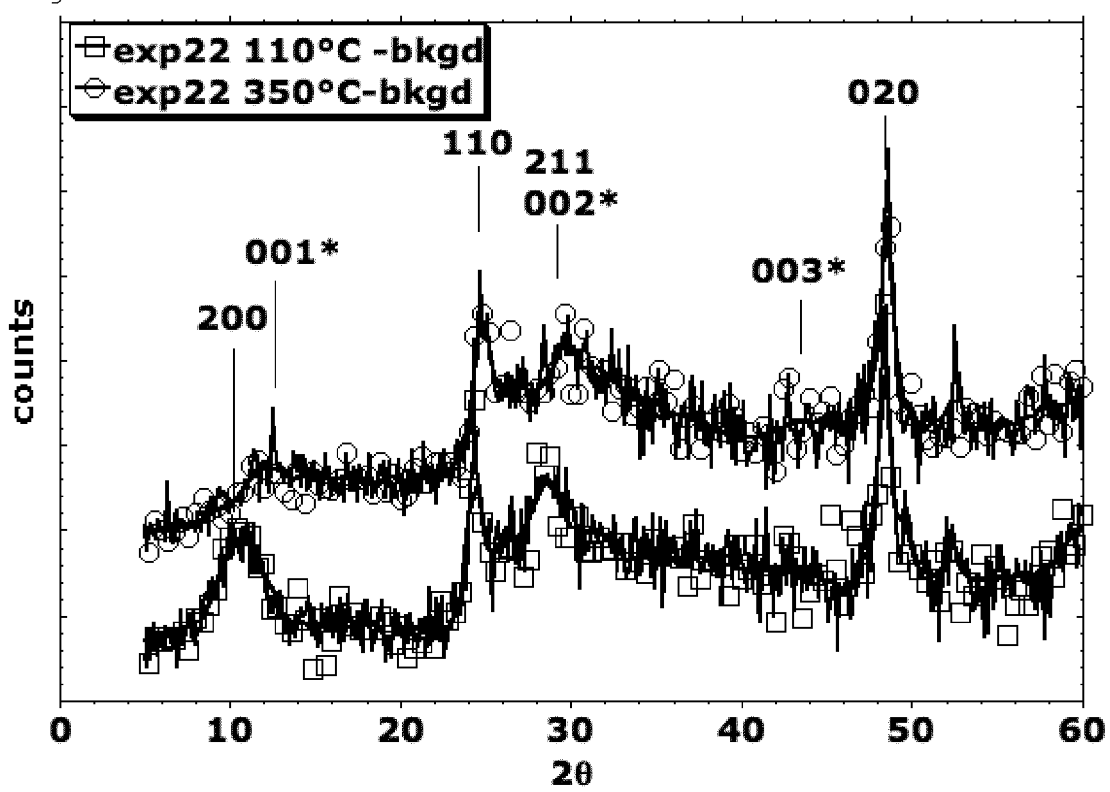
Fig 6
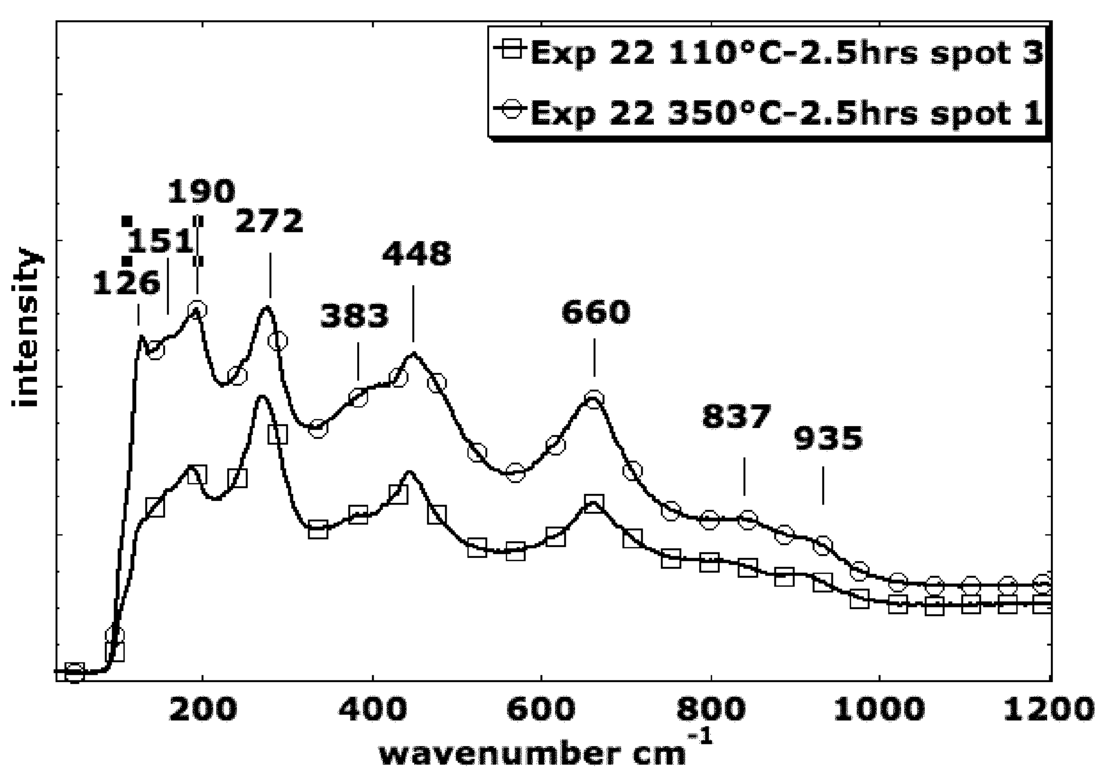

Fig 9
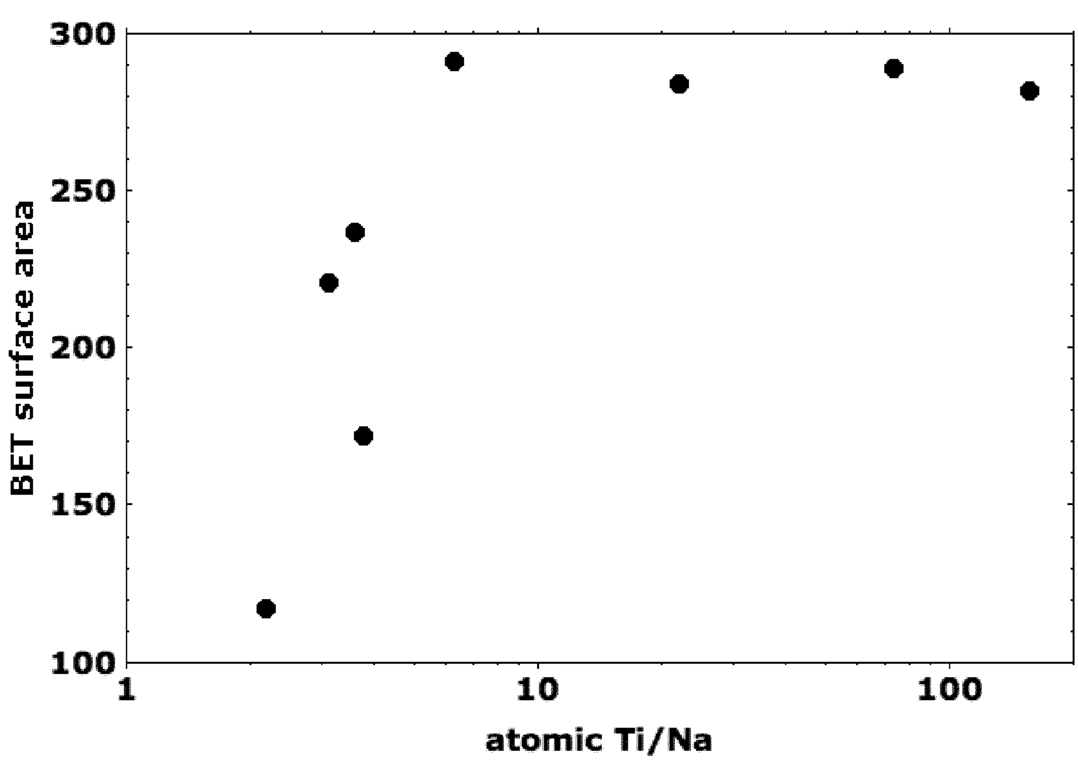
Fig 10
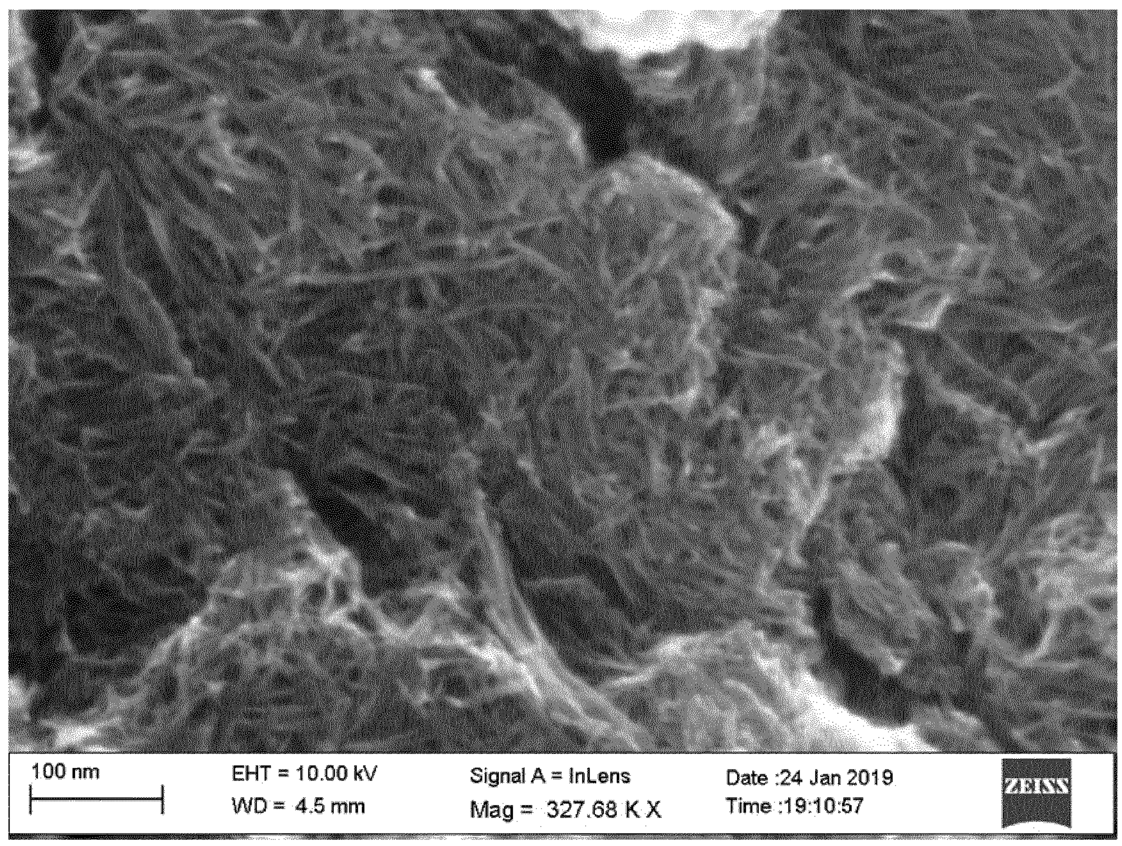

MANUFACTURE OF TITANIUM DIOXIDE STRUCTURES

TECHNICAL FIELD

The invention relates to a method for forming structures of a titanium compound, including structures selected from the group consisting of tubes, sheets, and/or wires. The invention further relates to an intermediate dispersion comprising titanium dioxide particles and an intermediate sol comprising titanium dioxide particles as well as to a structure comprising titanium dioxide in the form of tubes, sheets or wires.

BACKGROUND

One-dimensional (1D) nanomaterials have been studied a long time. Among the metal oxides, 1D titanium dioxide nanostructures, such as nanotubes, nanowires, and nanofibers have been studied for applications such as pollutants absorption and catalysis, photocatalysis, Na and Li-ion batteries, solar cells, sensors, and sensing techniques. Titanium dioxide nanotubes have high surface area and high ion exchange capabilities, which makes them more suitable for cation substitution in various applications. $TiO_2$(B), a titanium dioxide polymorph, herein also referred to as 'bronze' is particularly attractive for lithium ion batteries due to its favourable properties, not limited to its capacity, dimensional stability, low toxicity and environmental profile and non-flammability. Among the said favourable properties, these lend it favourable user properties in applications where fast charging, cycling stability, and high current demand are desirable.

Manufacture of titanium dioxide structures such as tubes and sheets are typically starting with titanium dioxide particles or powders, which are dispersed in a liquid.

WO 2015/038076 discloses a method of forming titanium dioxide nanotubes, the method comprising: heating a closed vessel containing a titanium dioxide precursor powder dispersed in a base, wherein content in the closed vessel is simultaneously stirred with a magnetic stirrer during the heating. Battery anodes and their manufacture are also disclosed.

CN 103693681 discloses a method for preparing ultra-long titanic acid micro-nanotubes using titanium dioxide powders by a low-temperature stirring hydrothermal method, which comprises using titanium dioxide and sodium hydroxide as raw materials in powder form to carry out hydrothermal reaction.

KR 20080057102 discloses a method of manufacturing a titanium dioxide nanotube starting with a sol comprising the steps of adding a titanium dioxide sol to a strongly alkaline aqueous solution, heating the strongly alkaline aqueous solution, adding hydrochloric acid to the strongly alkaline aqueous solution to adjust pH and washing with water. A titanium dioxide particle sol is mentioned to have a particle size of 30 nm or less. In the examples particles sizes of 20-30 nm is mentioned without added metal ions. Addition of different ions such as vanadium ions reduce the particle size to about 5 nm.

The most common methods in the prior art start with dispersing particles (powder) in a concentrated NaOH solution to obtain a suspension. This creates a number of problems.

US 2016/0207789 discloses a method of forming high aspect ratio titanate nanotubes. In particular, the formation of elongated nanotubes having lengths more than 10 μm involves a modified hydrothermal method. The method allows formation of an entangled network of the elongated nanotubes for use as free-standing membranes or powder form for use in various applications such as water treatment. The elongated nanotubes may also be used for forming electrodes for batteries.

U.S. Pat. No. 9,972,839 discloses a negative active material, a method of preparing the same, and a lithium secondary battery including the negative electrode. The negative active material includes a plurality of titanium oxide nanotubes, wherein the Raman shift of the negative active material includes a characteristic peak located at a Raman shift between about 680 $cm^{-1}$ and about 750 $cm^{-1}$.

US 2018/0261838 discloses carbon doped $TiO_2$-Bronze nanostructures, preferably nanowires were synthesized via a facile doping mechanism and were exploited as active material for Li-ion batteries. Both the wire geometry and the presence of carbon doping contribute to high electrochemical performance of these materials. Direct carbon doping for example reduces the Li-ion diffusion length and improves the electrical conductivity of the wires, as demonstrated by cycling experiments, which evidenced remarkably higher capacities and superior rate capability over the undoped nanowires. The as prepared carbon-doped nanowires, evaluated in lithium half-cells, exhibited lithium storage capacity of ~306 mA h $g^{-1}$ (91% of the theoretical capacity) at the current rate of 0.1 C as well as excellent discharge capacity of ~160 mAh $g^{-1}$ even at the current rate of 10 C after 1000 charge/discharge cycles.

US 2006/0264520 discloses surface-modified titanium dioxide particles which have a surface chemically modified with a hydrophilic polymer, wherein a carboxyl group of the hydrophilic polymer and titanium dioxide are bound through an ester bonding and a method for producing the surface-modified titanium dioxide fine particles, which comprises mixing a dispersion comprising titanium dioxide fine particles having a particle size of 2 to 200 nm and a solution of a water-soluble polymer, heating the resultant mixture to a temperature of 80 to 220° C., to thereby bind both the components through an ester bonding, and removing an unbound water-soluble polymer, to purify the resultant particles. The surface-modified titanium dioxide fine particles exhibit excellent dispersibility and stability in an aqueous solvent over a wide pH region including a neutral range.

Problems in the state of the art include powder aggregation and sedimentation that results in an inhomogeneous distribution of reactants, inhibition of reaction kinetics due to relatively low reaction surface area of the solid surfaces, inhibition of diffusion and mass transport within and near the powder aggregates, inhomogeneous reaction rates difficulty homogenizing the sedimented powder aggregates and exacerbation of these problems at increasing loads of particles. When the particles are dispersed in a liquid there is required a dispersion step to separate the powder particles to obtain a suspension, which may be time and energy consuming. Even then, if the source was a powder comprised of an agglomeration of large particles, stirring will not make these large particles smaller.

A further problem may occur if the method starts with a sol comprised of dispersed small particles, since these particles may irreversibly aggregate in strongly alkaline conditions to form larger particles which are slow to form titanates. It is a problem in the prior art to stabilize the particles over a range of pH values and also to allow aggregation to structures under economically realistic conditions.

It is desired to have a high specific surface area of dispersed particles used to manufacture the structure (i.e. tubes, wires and sheets) and to provide an efficient and economical process for manufacturing the structures in titanium dioxide.

SUMMARY

It is an object of the present invention to alleviate at least some of the problems in the prior art and to provide a method for manufacturing structures of titanium compounds, such as sheets, wires and/or tubes, which exhibit improved synthesis, enhanced properties of the resulting structures, and improved range of use.

The titanium compound may be an alkali metal titanate, a protonated titanate or titanium dioxide ($TiO_2$).

A sheet manufactured by a method according to the present disclosure may be curved.

The titanium structures manufactured by a method according to the present disclosure have many applications such as in osteointegration, catalysis, photo catalysis, water treatment, manufacture of electrodes for batteries, including anodes for lithium and sodium ion batteries.

In a first aspect there is provided a method for manufacturing a structure of a titanium compound selected from the group consisting of sheets, wires and tubes, the method comprising the steps of a) providing at least one titanic acid with the general formula $[TiO_x(OH)_{4-2x}]n$ and dissolving it in an aqueous solution comprising at least one compound selected from the group consisting of $TiOCl_2$, $TiCl_4$, and HCl so that a clear solution is obtained, wherein the pH of the clear solution is lower than 1 after dissolution; b) increasing the temperature of the clear solution until reaching a temperature in the interval 68-85° C. where precipitation starts to occur, adding at least one acidic stabilizer before the precipitation starts to occur, and holding that temperature during at least 1 minute during stirring to obtain a dispersion of particles comprising $TiO_2$ as an intermediate product; c) adjusting the concentration of hydroxide ions in the dispersion from step b) to at least 8 M by adding an alkali metal hydroxide MOH; d) treating the dispersion from step c) at a temperature in the interval 90-170° C. during 6-72 hours to obtain a plurality of first structures comprising alkali metal titanate; e) treating the plurality of first structures comprising alkali metal titanate to exchange at least a part of the alkali metal ions $M^+$ with $H^+$ to obtain a plurality of second structures comprising protonated titanate.

In an alternative of the first aspect there is provided a method for manufacturing a structure of a titanium compound selected from the group consisting of sheets, wires and tubes, the method comprising the steps of: ab) providing a dispersion of particles comprising $TiO_2$, wherein the average diameter of the particles in the dispersion is 3-20 nm, preferably 4-15 nm, more preferably, 4.5-7 nm, and wherein the dispersion comprises at least one alpha hydroxy acid as acidic stabilizer, c) adjusting the concentration of hydroxide ions in the dispersion from step ab) to at least 8 M by adding an alkali metal hydroxide MOH, d) treating the dispersion from step c) at a temperature in the interval 90-170° C. during 6-72 hours to obtain a plurality of first structures comprising alkali metal titanate, e) treating the plurality of first structures comprising alkali metal titanate to exchange at least a part of the alkali metal ions $M^+$ with $H^+$ to obtain a plurality of second structures comprising protonated titanate.

A clear solution as obtained above is defined as being nearly or completely transparent to visible light with little or no detectable cloudiness or scattering of visible light by undissolved titanic acid and may be determined by shining a visible light laser through the solution until it passes straight through the solution with little to no detectable scattering of visible light from within the solution to the naked eye. Alternately it may be detected in practise when ordinary 12 point printed text is resolved through a 10 cm path-length of the solution held in a glass pipe.

MOH denotes an alkali metal hydroxide, wherein "M" denotes the alkali metal. The alkali metal hydroxide (MOH) may be selected from the group consisting of sodium hydroxide (NaOH) and potassium hydroxide (KOH).

One advantage of this method is that the particle size in a sol made this way can be tuned by adjusting the ratio of dissolved titanic acid to the amount of $TiOCl_2$ solution used to dissolve the titanic acid.

In one embodiment, the method further comprises, after step b) and before step c), the steps of b1) decreasing the content of ions in the dispersion preferably such that the ion concentration is lowered to a point where a sol is formed, wherein the average diameter of the particles in the sol is 3-20 nm, preferably 4-15 nm, more preferably, 4.5-7 nm, and b2) adjusting the concentration of $TiO_2$ in the dispersion preferably to a value within the range of 10-80%, more preferably to a value within the range 20-70%, most preferably to a value within the range 30-50%.

This results in a sol being formed after steps b1) and b2), which may then used to produce the structures comprising a titanium compound.

Step b1) may be performed before step b2). Steps b1) and b2) may be repeated several times.

Step b2) may be performed before step b1). Steps b2) and b1) may be repeated several times.

An advantage of a method comprising steps b1) and b2) is increasing the $TiO_2$ concentration without concentrating other species in the dispersion.

After steps b1) and b2) an alkali sol of $TiO_2$ is formed.

In a second embodiment, the dispersion after step b) or the sol after steps b1) and b2) comprises at least 15 wt % titanium dioxide, preferably at least 17 wt % titanium dioxide, more preferably at least 25 wt % titanium dioxide, even more preferably at least 30 wt % titanium dioxide, and even more preferably at least 40 wt % titanium dioxide, and most preferably at least 50 wt % titanium dioxide.

Preferably, the dispersion after step b) or the sol after steps b1) and b2) comprises 80 wt % titanium dioxide or less. Thus, the dispersion after step b) or the sol after steps b1) and b2) may comprise 15-80 wt %, 17-80 wt %, 25-80 wt %, 30-80 wt %, 40-80 wt %, or 50-80 wt % titanium dioxide.

A high content of titanium dioxide ($TiO_2$) is desired because it leads to higher density dispersions relative to those of lower concentrations. Higher density dispersions means more titanium dioxide in a given volume, which can translate directly to higher yields for a fixed volume reactor. Additionally, it is desired as it reduces the overall volume of dispersions used per unit of titanium dioxide, which can be an advantage in lowering costs and time related to storage and handling.

In another embodiment, the plurality of second structures comprising protonated titanate obtained after step e) are heated to a temperature in the range 300-700° C., preferably 300-600° C., more preferably 300-450° C., most preferably 300-400° C. to obtain a plurality of third structures comprising titanium dioxide.

Thus, the method according to the present disclosure may further comprise, after step e), the step of f) heating the plurality of second structures comprising protonated titanate obtained after step e) to a temperature in the range 300-700° C., preferably 300-600° C., more preferably 300-450° C., most preferably 300-400° C. to obtain a plurality of third structures comprising titanium dioxide.

In one embodiment the heating is conducted as long as titanium dioxide in anatase form is not formed as measured by Raman spectroscopy. Samples can be taken after different heating times and can be analysed with Raman spectroscopy in order to ensure that anatase is not formed. In general the anatase form is not desired for most applications. In one embodiment, the heating is conducted for a period in the interval 0.5 to 10 hours. Normally the heating will be in an interval of 0.5 to 10 hours. I a Raman analysis cannot be conducted a heating period in the interval 0.5 to 10 hours can be performed.

In a further embodiment, the at least one acidic stabilizer is selected from a carboxylic acid, and an alpha hydroxy acid. In one embodiment the at least one acidic stabilizer is an alpha hydroxy acid.

In yet another embodiment, at least one alkanolamine and at least one acidic stabilizer are added together before step c).

One advantage of adding at least one alkanolamine and at least one acidic stabilizer together before step d) is that it stabilizes particles against aggregation at pH values above the isoelectric point of titanium dioxide.

Use of an alpha hydroxyl acid not only prevents agglomeration of particles but also allows formation of structures such as sheets, wires and tubes, especially under economically realistic conditions, i.e. avoiding excessively high pressure and/or excessively high temperatures. Alpha hydroxy acids have first pKa's≤3.8, can complex with Ti, can limit particle growth and can stabilize particles against aggregation over a range of pH values.

In a further embodiment, the carboxylic acid is selected from the group consisting of citric acid, and lactic acid. In another embodiment, the carboxylic acid is selected from the group consisting of citric acid, malic acid, tartaric acid, and lactic acid."

Such alpha hydroxy acids are particularly preferred because they have first pKa's≤3.8, can complex with Ti, can limit particle growth and can stabilize particles against aggregation over a range of pH values.

In another embodiment, stirring is performed during step d).

Stirring during step d) homogenises the reaction medium leading to homogeneous reaction conditions and preferentially enhances crystal growth in one dimension so that longer tubes are formed.

According to yet another embodiment, the dispersion has remained in a dispersed state without drying and subsequent redispersion between steps b) and c).

This has the effect that no powders need be handled between steps b) and c).

In a further embodiment, the dispersion is dried and redispersed between steps b) and c).

This has the effect that the titanium dioxide is maximally concentrated for a given dispersion and so can be stored and, processed and handled in smaller volumes compared with dispersions of the same titanium content.

In yet another embodiment, the specific surface area, as measured according to ISO 9277 of the particles dried from the dispersion obtained after step b), is in the range 200-300 $m^2/g$.

A specific surface area in the range 200-300 $m^2/g$ has the effect of indicating the particles in the dispersion also have a high specific surface area available for reaction in step d) therefore a high rate of reaction in step d).

In a further embodiment, the pH after dissolution in step a) is lower than 0.

In a further embodiment, the pH of the dispersion resulting from step b) or the sol resulting from steps b1) and b2) is adjusted to a value in the range 0.5-1.5.

This has the effect of obtaining an acidic sol.

In another embodiment, the concentration of hydroxide ions is adjusted in step c) using NaOH.

One advantage of adjusting the pH using NaOH is that it that NaOH is inexpensive compared to KOH.

According to yet another embodiment, the titanic acid provided in step a) is made from a $TiOCl_2$ by neutralisation until precipitation by an aqueous solution of NaOH.

According to a further embodiment, the plurality of first structures comprising alkali metal titanate are separated from the remaining liquid between steps d) and e).

This is advantageous, since this lowers the NaOH content before step e).

According to yet another embodiment, the treatment of the dispersion in step d) is performed at autogenous pressure.

This has the effect that the pressure need not be regulated to a certain value nor monitored.

According to a further embodiment, no transition metal ions except titanium are added.

The present disclosure also provides a method for manufacturing a dispersion of particles comprising $TiO_2$ and comprising at least one acidic stabilizer, the method comprising the steps a) and b). All modifications of the steps a) and b disclosed herein also apply to this method for manufacturing a dispersion of particles comprising $TiO_2$ and comprising at least one acidic stabilizer.

The present disclosure also provides a method for manufacturing a sol of particles comprising $TiO_2$ and comprising at least one acidic stabilizer, the method comprising the steps a), b), b1) and b2). All modifications of the steps a), b), b1) and b2) disclosed herein also apply to the method for manufacturing a sol of particles comprising $TiO_2$ and comprising at least one acidic stabilizer.

The present disclosure also provides a method for manufacturing a structure comprising alkali metal titanate, the method comprising the steps a), b), c) and d). One embodiment of this method also comprises the steps b1) and b2). All modifications of the steps a), b), b1), b2), c) and d) disclosed herein also apply to the method for manufacturing a structure comprising alkali metal titanate.

The present disclosure also provides a method for manufacturing a structure comprising protonated titanate, the method comprising the steps a), b), c), d) and e). One embodiment of this method also comprises the steps b1) and b2). All modifications of the steps a), b), b1), b2), c), d) and e) disclosed herein also apply to the method for manufacturing a structure comprising protonated titanate.

The present disclosure also provides a method for manufacturing a structure comprising titanium dioxide, the method comprising the steps a), b), c), d), e) and f). One embodiment of this method also comprises the steps b1) and b2). All modifications of the steps a), b), b1), b2), c), d), e) and f) disclosed herein also apply to the method for manufacturing a structure comprising titanium dioxide.

According to a second aspect of the invention, an intermediate product obtained after step b) of the method is provided, the intermediate product being a dispersion of particles comprising $TiO_2$ and comprising at least one acidic stabilizer.

The dispersion may comprise at least 15 wt % $TiO_2$, preferably at least 17 wt % $TiO_2$, more preferably at least 25 wt % $TiO_2$, even more preferably at least 30 wt % $TiO_2$, even more preferably at least 40 wt % $TiO_2$, and most preferably at least 50 wt % titanium dioxide.

Preferably, the dispersion comprises 80 wt % titanium dioxide or less. Thus, the dispersion may comprise 15-80 wt %, 17-80 wt %, 25-80 wt %, 30-80 wt %, 40-80 wt %, or 50-80 wt % titanium dioxide.

A high content of titanium dioxide ($TiO_2$) is desired because more titanium dioxide is contained in a given volume which can provide an economic advantage in storage, processing and handling of higher concentrated dispersions relative to lower concentration dispersions.

Furthermore, the at least one acidic stabilizer may be at least one selected from a carboxylic acid, and an alpha hydroxy acid.

Preferably, the carboxylic acid is selected from the group consisting of citric acid, and lactic acid. Such alpha hydroxy acids are particularly preferred because they have first pKa's≤3.8, can complex with Ti, can limit particle growth and can stabilize particles against aggregation over a range of pH values.

Moreover, the pH may be in the range 0.5-9.

The pH may be adjusted to a value in the range 0.5-1.5. This has the effect of yielding an acidic sol.

The pH may be adjusted to a value in the range 5.5-7.5. This has the effect of yielding a neutral sol.

The pH may be adjusted to a value in the range 7.5-9. This has the effect of yielding an alkaline sol.

Furthermore, the specific surface area measured according to ISO 9277 of the particles dried from the dispersion may be in the range 200-300 $m^2/g$.

A specific surface area in the range 200-300 $m^2/g$ has the effect of indicating that the particles in the dispersion also have a high specific surface area available for reaction in step d) therefore a high rate of reaction in step d).

Thus, an intermediate product is provided, wherein the intermediate product is a dispersion of particles comprising $TiO_2$ and comprising at least one acidic stabilizer and wherein the intermediate product optionally exhibits one or more of the following features:

- the dispersion comprises at least 15 wt % $TiO_2$, preferably at least 17 wt % $TiO_2$, more preferably at least 25 wt % $TiO_2$, even more preferably at least 30 wt % $TiO_2$, even more preferably at least 40 wt % $TiO_2$, and most preferably at least 50 wt % titanium dioxide;
- the at least one acidic stabilizer is at least one selected from a carboxylic acid, and an alpha hydroxy acid;
- the pH is in the range 0.5-9;
- the specific surface area measured according to ISO 9277 of the particles dried from the dispersion is in the range 200-300 $m^2/g$.

According to a third aspect, an intermediate product obtained after steps b1) and b2) of the method is provided, the intermediate product being a sol of particles comprising $TiO_2$ and comprising at least one acidic stabilizer.

The sol may comprise at least 15 wt % $TiO_2$, preferably at least 17 wt % $TiO_2$, more preferably at least 25 wt % $TiO_2$, even more preferably at least 30 wt % $TiO_2$, even more preferably at least 40 wt % $TiO_2$, and most preferably at least 50 wt % titanium dioxide.

Preferably, the sol comprises 80 wt % (percentage by weight) titanium dioxide or less. Thus, the sol may comprise 15-80 wt %, 17-80 wt %, 25-80 wt %, 30-80 wt %, 40-80 wt %, or 50-80 wt % titanium dioxide.

A high content of titanium dioxide ($TiO_2$) is desired because more titanium dioxide is contained in a given volume which can provide an economic advantage in storage, processing and handling of higher concentrated dispersions relative to lower concentration dispersions.

Furthermore, the at least one acidic stabilizer is at least one selected from a carboxylic acid, and an alpha hydroxy acid.

Preferably, the carboxylic acid is selected from the group consisting of citric acid, and lactic acid.

Moreover, the pH may be in the range 0.5-9.

The pH may be adjusted to a value in the range 0.5-1.5. This has the effect of yielding an acidic sol.

The pH may be adjusted to a value in the range 5.5-7.5. This has the effect of yielding a neutral sol.

The pH may be adjusted to a value in the range 7.5-9. This has the effect of yielding an alkaline sol.

Furthermore, the specific surface area measured according to ISO 9277 of the particles dried from the dispersion may be in the range 200-300 $m^2/g$.

A specific surface area in the range 200-300 $m^2/g$ has the effect of indicating the particles in the dispersion also have a high specific surface area available for reaction in step d) therefore a high rate of reaction in step d).

Thus, an intermediate product is provided, wherein the intermediate product is a sol of particles comprising $TiO_2$ and comprising at least one acidic stabilizer and wherein the intermediate product optionally exhibits one or more of the following features:

- the sol comprises at least 15 wt % $TiO_2$, preferably at least 17 wt % $TiO_2$, more preferably at least 25 wt % $TiO_2$, even more preferably at least 30 wt % $TiO_2$, even more preferably at least 40 wt % $TiO_2$, and most preferably at least 50 wt % titanium dioxide;
- the at least one acidic stabilizer is at least one selected from a carboxylic acid, and an alpha hydroxy acid;
- the pH is in the range 0.5-9;
- the specific surface area measured according to ISO 9277 of the particles dried from the sol is in the range 200-300 $m^2/g$.

The present disclosure also provides an intermediate product obtained after step d) of the method disclosed herein, the intermediate product being a structure comprising an alkali metal titanate. The structure comprising an alkali metal titanate is thus obtained by a method comprising the steps a), b), c) and d), and optionally comprising the steps b1) and b2), as disclosed above. Preferably, the structure comprising an alkali metal titanate is in the form of a sheet, a wire and/or a tube.

The present disclosure also provides an intermediate product obtained after step e) of the method disclosed herein, the intermediate product being a structure comprising a protonated titanate. The structure comprising a protonated titanate is thus obtained by a method comprising the steps a), b), c), d) and e), and optionally comprising the steps b1) and b2), as disclosed above. Preferably, the structure comprising a protonated titanate is in the form of a sheet, a wire and/or a tube.

The present disclosure also provides an intermediate product obtained after step f) of the method disclosed herein, the intermediate product being a structure comprising titanium dioxide. The structure comprising titanium dioxide is thus obtained by a method comprising the steps a), b), c), d), e) and f), and optionally comprising the steps b1) and b2), as disclosed above. Preferably, the structure comprising titanium dioxide is in the form of a sheet, a wire and/or a tube.

According to a fourth aspect, a structure comprising titanium dioxide is provided, said structure being one of a sheet, a wire, and a tube, said structure being made according to the method disclosed herein.

The structure may constitute a part of a Li ion or sodium ion battery anode.

The structure may constitute a part of a photocatalytic object.

The structure may constitute a surface modification or treatment of a titanium dental or bone implant.

The present invention also discloses the use of a highly concentrated sol comprising titanium dioxide particles for making sheets, wires and tubes. The sol may be obtained by the steps a), b), b1 and b2) as described herein. The sol comprises at least 15 wt % titanium dioxide, preferably at least 17 wt % titanium dioxide, more preferably at least 25 wt % titanium dioxide, even more preferably at least 30 wt % titanium dioxide, and even more preferably at least 40 wt % titanium dioxide, and most preferably at least 50 wt % titanium dioxide. Preferably, the sol comprises 80 wt % titanium dioxide or less. Thus, the dispersion after step b) or the sol after steps b1) and b2) may comprise 15-80 wt %, 17-80 wt %, 25-80 wt %, 30-80 wt %, 40-80 wt %, or 50-80 wt % titanium dioxide.

Advantages of the invention include the possibility of having smaller diameter structures and or comprising thinner walls of the sheets, wires or tubes, the latter giving larger specific surface areas for the obtained structures as well as a lower probability of agglomeration during reaction and thus faster kinetics in forming the said structures.

BRIEF DESCRIPTION OF THE FIGURES

FIG. 5 shows X-ray powder diffraction (XRD) patterns corresponding to the product of heat treating the plurality of second structures obtained from experiment RWC-1-022 of Tables 1 and 2.

FIG. 6 shows Raman spectra of the same samples in FIG. 5.

FIG. 9 shows the Ti/Na ratio measured from EDX (see Table 2) versus the specific surface area of the 350° C. treated samples, as discussed in the caption to FIG. 1.

FIG. 10 shows an SEM image of sample RWC-1-005, with well formed elongate aggregated clusters of tubes/rods forming a porous solid.

Figure 1:
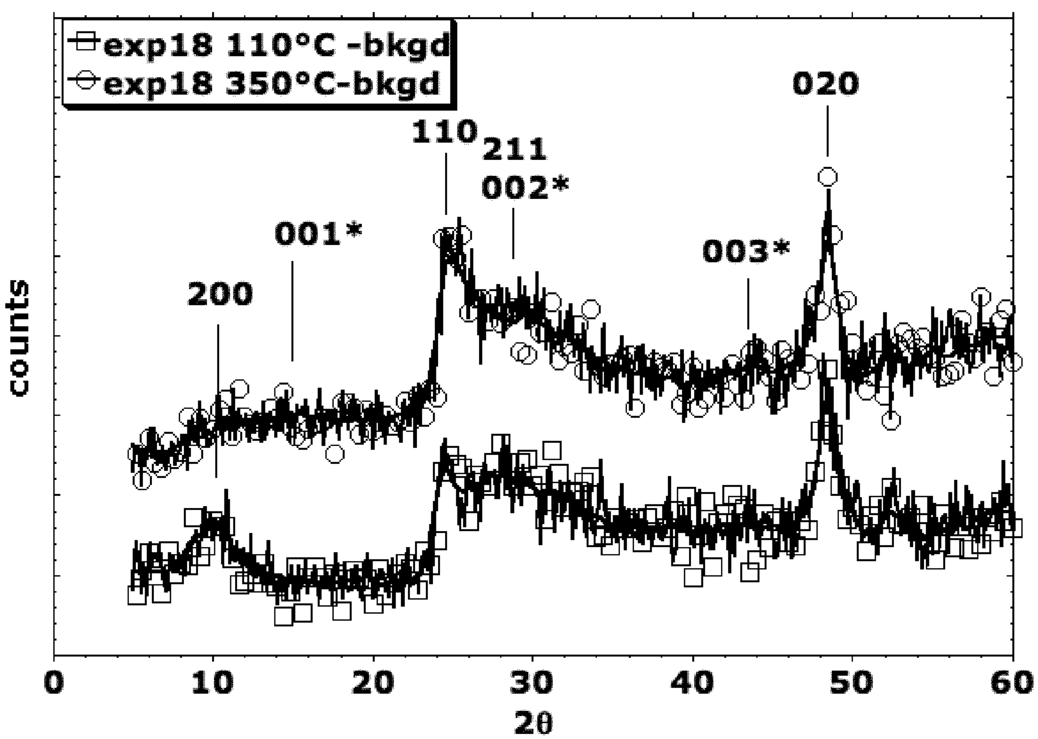
FIG. 1 shows X-ray powder diffraction (XRD) patterns corresponding to the product of heat treating the plurality of second structures obtained from experiment RWC-1-018 of Tables 1 and 2.
Figure 1:

Table 1 shows conditions for the examples.

Table 2 shows results from the examples.

DETAILED DESCRIPTION

The following detailed description discloses by way of examples details and embodiments by which the invention may be practised.

It is to be understood that the terminology employed herein is used for the purpose of describing particular embodiments only and is not intended to be limiting since the scope of the present invention is limited only by the appended claims and equivalents thereof.

If nothing else is defined, any terms and scientific terminology used herein are intended to have the meanings commonly understood by those of skill in the art to which this invention pertains.

It should be noted that, as used in this specification and the attached claims, the singular terms "a", "an" and "the" may in some cases be construed to include plural terms, unless the context clearly dictates otherwise.

A 'clear solution' is defined as being nearly or completely transparent to visible light with little or no detectable cloudiness or scattering of visible light by undissolved titanic acid and may be determined by shining a visible light laser through the solution until it passes straight through the solution with little to no detectable scattering of visible light from within the solution to the naked eye. Alternately it may be detected in practise when ordinary 12 point printed text is resolved through a 10 cm path-length of the solution held in a glass pipe.

'Stabilizer' as used throughout the description and claims denotes a substance which interacts with the titanium dioxide particles and which is utilized to control factors such as agglomeration and dispersion of the titanium dioxide particles. Stabilizer is sometimes referred to as a capping agent and further has the effect that the titanium dioxide particles do not become so large during the manufacture. Without wishing to be bound by any specific scientific theory the inventors believe that the stabilizer binds to the titanium dioxide particles, and thereby affects the surface properties and colloidal behaviour of the titanium dioxide particles, in particular with respect to their agglomeration, and so enhancing the colloidal stability of individual nanoparticles in a sol.

Further, for crystalline matter in the titanium dioxide particles the stabilizer may bind differently to different crystal planes and thereby modify the crystallization habit.

'XRD' denotes X-ray powder diffraction, 'SEM' denotes scanning electron microscopy, 'TEM' denotes transmission electron microscopy, 'EDX' denotes energy dispersive x-ray analysis, 'TGA' denotes thermogravimetric analysis, and SEI denotes solid-electrolyte interphase.

'Specific surface area', sometimes referred to as BET surface area or BET area, is the surface area measured in units of $m^2 \cdot g^1$ determined according to ISO 9277.

'Dispersion' as used throughout the description and claims can be a suspension or a sol.

'Suspension' as used throughout the description and claims are solid particles in a liquid medium. For a suspension the particles are at least partially so large that they settle after some time due to gravity.

'Sol' as used throughout the description and claims is a type of colloid in which the dispersed phase is solid and the dispersion media is liquid. In general, a sol is essentially stable and the particles do not settle by gravity. Although a sol is in general stable, there may be exceptional solid particles, which settle anyway. Even if a sol is described as stable a skilled person realizes that there may be some very few larger particles which may settle anyway. Such larger particles can be regarded as an impurity. Since a sol is dispersed solid particles in a liquid medium, a sol can also be called a dispersion. Thus the term "sol" can be replaced with the word "dispersion".

For some dispersed solid particles in a liquid it may be the case that some of the particles are so small that they do not settle, whereas other particles are larger and settle due to gravity over time. For such mixtures the term sol can also be used.

'Wt %' denotes percentage by weight.

'Titanium oxide' as used throughout the description and claims denotes all possible oxides of titanium, including but not limited to titanium(II) oxide TiO, titanium(III) oxide $Ti_2O_3$, titanium(IV) oxide $TiO_2$. The term titanium oxide further includes but is not limited to $Ti_3O$, $Ti_2O$, $Ti_3O_5$, and $Ti_4O_7$. A skilled person realizes that titanium oxides may form various hydrates also known as amorphous titania whereby a variable fraction of TiOH groups exist with Ti oxides and these can convert to Ti oxide via water release. All such hydrates are encompassed within the term. Of particular interest is titanium dioxide $TiO_2$.

The relative acidity (A) is defined in terms of the mass ratio, 'M', where M is the ratio of the mass Ti in a neutralised suspension titanic acid at pH 5.5 and to the mass of Ti in the aqueous solution used in step a) to dissolve the titanic acid. Herein, the relative acidity is defined to be A=1/M. In Example 1 below, the ratio, M of two masses was 3:7, or expressed as a fraction, the ratio can be expressed, R=3/7=0.43, In this case A=1/0.43=7/3=2.333. R=1:9 to 9:1, or R=1/9 to 9, or A=0.11 to 9 were explored and particle sizes and yields were examined after step b). Towards higher A values mean particle size was smaller and yields were lower. Towards lower relative acidity values, A, particle sizes were larger and yields were higher. For those skilled in the art it is understood that nucleation occurs at the first stage of particle formation, and it is believed that this occurs just prior to precipitation of the intermediate product during step b). At this nucleation stage, it is believed that a higher relative acidity A, will favour a larger total number of nuclei and lower yields after step b) due to the relatively higher solubility of the dissolved Ti species at high relative acidity. At this nucleation stage, it is believed that a lower relative acidity A, will favour a smaller total number of nuclei and higher yields after step b) due to the relative lower solubility of the dissolved Ti species at high relative acidity. Those skilled in the art realize that the particle sizes and yields indicated by the relative acidity, A will also depend on differences in compositions of the starting materials, for example the acid content. However for practical purposes, it is preferred for ease of processing, costs and quality control to use the same source batch for all the Ti containing species of step a), making the ratio A easy to calculate from solution masses alone for a given composition.

'Structure' or 'structures' as used throughout the description and claims denotes any structures (including their hydrates), typically built up of compounds comprising layered alkali metal titanates, layered protonated titanates and titanium dioxides $TiO_2$(B)—'bronze' or $TiO_2$— anatase, the latter $TiO_2$ structures also includes bronze and anatase structures with various crystal defects. Sheets, wires and tubes are encompassed within the term. The tubes, wires and sheets are sometimes referred to as nanotubes, nanowires and nanosheets because of their size. A tube is generally considered to be hollow inside. A wire is generally considered not to be hollow inside. Since it sometimes may be experimentally difficult to distinguish between hollow tubes and non-hollow wires the terms are sometimes used interchangeably so that tube sometimes may denote non-hollow tubes, i.e. wires. A sheet is a structure having three dimensions, or two dimensions if its thickness is very small (at least one to two orders of magnitude) compared to the length and width dimensions of the sheet.

The titanates formed at steps d) and e), are believed to be of a layered structure with general formula $A_2Ti_nO_{2n+1}$ where A is one of hydrogen or an alkali metal, n is 3 to 6. These can also form hydrates such as $H_2Ti_4O_9 \cdot H_2O$ and $H_2Ti_5O_{11} \cdot 2.5H_2O$. The layers may be defined as the corrugated or stepped layers of $TiO_6$ polyhedra that make up the monoclinic unit cell of the titanate layer structures. Other layered titanate forms are known which have non-corrugated, non-stepped layers and have an orthorhombic unit cell. The layers are charged and interlayer Na or H ions counterbalance the charges of the layers. A 'stack of layers' is hereby defined as a sheet of one or more layers.

'Delamination' is defined as when one or more layers separate from a sheet comprising one or more layers.

Delamination increases the likelihood of forming curved structures. Single layers are thin and relatively flexible and can bend, roll, fold or otherwise deform into a plethora of curved shapes, with radii of curvature (r) more likely to be smaller the thinner the layer stack for a given bending stress.

The types of curved structures formed from full or partially delaminated layers include, but are not limited to, those structures which curve primarily along one direction only—these can be open or closed seam tubes, scrolls, half pipes, cones, ribbons and other layer structures that have zero Gaussian curvature (K) and some finite mean curvature (M) (not including the points at the edges of the sheets). Gaussian curvature is the product of the two principle curvatures at a point on the surface, $k_1=1/r_1$ and $k_2=1/r_2$ at a point on the sheet and mean curvature is the average of the two principle radii of curvature at a point on the sheet.

More complex curved structures can form if the sheets bend in in two directions so that the Gaussian curvature is non zero (positive or negative) if the layers are sufficiently distorted for example through bond rearrangements, bond breakage and local compositional variations.

Further, more complex structures can form when a plethora of individual structures comprising one or more of the said curved structures assemble into super structures including but not limited to mesoporous and/or macroporous networks, sponges, bundles and films. In the latter case of films, the network structure can be formed from previously undried suspensions, i.e. a dispersion or a sol, of structures by a variety of methods including casting, blade coating, spin coating, spraying, dipping, or by subjecting previously constructed films of $TiO_2$ nanoparticles to one or more of the steps c-f disclosed herein for manufacturing a structure of a titanium compound selected from the group consisting of sheets, a wires and tubes.

Upon heating (step f)), layered titanate structures are believed to go through several intermediate stages of condensation of adjacent layers and dehydration, and can eventually form $TiO_2$(B) above approximately 300° C. It is believed that the same progression from layered titanate to $TiO_2$(B) can occur for the curved structures, albeit with some expected distortions/defects in the crystal structures relative to those that are substantially uncurved. In cases where high alkali metal/Ti ratio exists in the precursor layer structure, the product of heating may also include the alkali metal bronze structure $M_xTiO_2$, which has the same Ti—O network structure as $TiO_2$(B). At temperatures lower than that required to form $TiO_2$ (B), an intermediate product can also form during heating of proton rich titanates that has a structure close to $TiO_2$(B). Such structural progression during heating has been considered by Feist et al., Journal of Solid State Chemistry 101, 275-295 (1992). They pointed out that different hydrate step lengths of protonated hydrates can result in differing Raman spectra, indicating differing degrees of crystalline order for the $TiO_2$(B) formed from them and so we here define $TiO_2$(B) as also including these variants and the $TiO_2$(B) like intermediate considered by Feist et al. (1992), since they are sometimes difficult to distinguish and quite possibly coexist in the heated structures disclosed herein.

According to the present disclosure, a method for manufacturing a structure of a titanium compound selected from the group consisting of sheets, wires and tubes is provided. The method comprises the steps of a) providing at least one titanic acid with the general formula $[TiO_x(OH)_{4-2x}]_n$ and dissolving it in an aqueous solution comprising at least one compound selected from the group consisting of $TiOCl_2$, $TiCl_4$, and HCl so that a clear solution is obtained, wherein the pH of the clear solution is lower than 1 after dissolution;
b) increasing the temperature of the clear solution until reaching a temperature in the interval 68-85° C. where precipitation starts to occur, adding at least one acidic stabilizer is before the precipitation starts to occur, and holding that temperature during at least 1 minute during stirring to obtain a dispersion of particles comprising $TiO_2$ as an intermediate product;
c) adjusting the concentration of hydroxide ions in the dispersion from step b) to at least 8 M by adding an alkali metal hydroxide MOH;
d) treating the dispersion from step c) at a temperature in the interval 90-170° C. during 6-72 hours to obtain a plurality of first structures comprising alkali metal titanate; and
e) treating the plurality of first structures comprising alkali metal titanate to exchange at least a part of the alkali metal ions $M^+$ with $H^+$ to obtain a plurality of second structures comprising protonated titanate.

In the formula $[TiO_x(OH)_{4-2x}]_n$ x is 0 for $H_4TiO_4$ and 1 for $H_2TiO_3$. n is an integer. The formula can also be expressed without n.

The method may further comprise, after step b) and before step c), the steps of b1) decreasing the content of ions in the dispersion preferably such that the ion concentration is lowered to a point where a sol is formed, wherein the average diameter of the particles in the sol is 3-20 nm, preferably 4-15 nm, more preferably, 4.5-7 nm, and
b2) adjusting the concentration of $TiO_2$ in the dispersion preferably to a value within the range of 10-80%, more preferably to a value within the range 20-70%, most preferably to a value within the range 30-50%.

This results in a sol being formed after steps b1) and b2), which may then used to produce the structures comprising a titanium compound. Step b1) may be performed before step b2). Steps b1) and b2) may be repeated several times. Step b2) may be performed before step b1). Steps b2) and b1) may be repeated several times.

The titanic acid provided in step a) may be made by neutralizing a $TiOCl_2$ solution by addition of an aqueous solution of NaOH so that the titanic acid precipitates and flocculates as a white solid phase.

In one embodiment, the pH after dissolution in step a) is lower than 0.

It is difficult to measure low pH values such as lower than 0, and instead an estimate can be made based on calculated $H^+$ concentration. The calculated pH for the clear solution obtained after step a) and b) of example 1 below was approximately −0.8. This value could be lower or higher depending upon the acid content of the $TiOCl_2$ solution added to dissolve the provided titanic acid of step a) and the amount of that $TiOCl_2$ solution added to dissolve the titanic acid of step a). In Example 1 it is also clear that the pH after step a) is also dependent upon the pH of the aqueous suspension of titanic acid formed by neutralisation with NaOH. In this respect the pH after dissolution of step a), even if not known precisely, can be understood by a relative acidity calculation (as described above) for a given Ti source or sources of all titanium compounds in step a), i.e., where the provided, at least one titanic acid is dissolved it in at least one selected from the group consisting of $TiOCl_2$, $TiCl_4$ and HCl.

The relative acidity, A, after dissolution in step a) may be in the range 1-2.

The relative acidity, A, after dissolution in step a) may be in the range 2-3.

The relative acidity, A, after dissolution in step a) may be in the range 3-4.

The relative acidity, A, after dissolution in step a) in the range 5-7.

In a particular embodiment the relative acidity, A is in the range 7-9.

The content of ions in the dispersion obtained in step a) may be decreased in optional step b1), preferably such that the ion concentration is lowered to a point where a sol is formed. This can be achieved by one of a combination of the following methods employing dilution, filtration, ultrafiltration dialysis, diafiltration, cross flow filtration.

In other words, the content of ions in the dispersion is decreased in optional step b1) preferably such that the ion concentration is lowered to a point where a sol is formed wherein the average diameter of the particles in the sol is 3-20 nm, preferably 4-15 nm, more preferably, 4.5-7 nm.

The sol obtained after steps b1) and b2) comprises at least 50 wt % titanium dioxide. In order to obtain concentrations approaching 50 wt % titanium dioxide and over it is in general necessary to decrease the content of ions according to optional step b1. If the content of ions is decreased the amount of titanium dioxide can be higher such as 60 and 70 wt % $TiO_2$.

The pH of the dispersion of particles obtained after step b), or the sol obtained after steps b1 and/or b2) may be adjusted to a value in the range 0.5-9. The pH adjustment makes it easier to handle and store the intermediate product.

The dispersion obtained after step b2 may be at least 50 wt % titanium dioxide. The dispersion obtained after step b2 may be up to 80 wt % titanium dioxide.

The sol obtained after steps b1) and/or b2) may be taken directly to step c) without drying and redispersion before step c).

Alternatively, a sol obtained after steps b1) and/or b2) may be dried and redispersed before step c). An acidic and or alkaline stabilizer (as discussed below) helps to preserve the dispersed state of the particles during redispersion and counteracts irreversible aggregation when the sol is dried down to a solid or powder prior to redispersion.

Typically, the specific surface area measured according to ISO 9277 of the particles dried from a sol obtained after step b1) and/or b2) is in the range 200-300 $m^2/g$.

In one embodiment, the dispersion obtained after step b2) or after steps b1) and b2) comprises a sol of at least 15 wt % titanium dioxide, preferably at least 25 wt % titanium dioxide, more preferably at least 30 wt % titanium dioxide, even more preferably at least 40 wt % titanium dioxide, and most preferably at least 50 wt % titanium dioxide. The high concentration improves the yield after step d) and the method makes it possible to use a high concentration of $TiO_2$ particles, which in turn can give a higher yield after step d). Further, in expensive hydrothermal reactors which can be used for the process, especially in large scale, it is possible to have a larger amount of titanium dioxide particles in each batch making the process to manufacture a structure of a titanium compound selected from the group consisting of sheets, wires and tubes more economical.

In one embodiment, no transition metal ions except titanium are added in steps a) or b). It is an advantage that no metal ions have to be added since it simplifies the process and reduces the cost.

The dispersion obtained after step b) or b2) may be subjected to ion reduction step b1) to obtain an intermediate product.

The dispersion obtained after step b) or step b1) may be subjected to a concentration step b2) by one or a combination of methods selected from vacuum drying, settling and decantation, centrifugation, filtration, such as e.g. ultrafiltration, cross flow filtration, tangential flow filtration, and nanofilteration.

Furthermore, according to the present disclosure, an alternative method for manufacturing a structure of a titanium compound selected from the group consisting of sheets, wires and tubes is provided. The method comprising the steps of i) providing a sol of particles comprising $TiO_2$, wherein the average diameter of the particles in the sol is 3-20 nm, preferably 4-15 nm, more preferably, 4.5-7 nm, and wherein the sol comprises at least one acidic stabilizer;

c) adjusting the concentration of hydroxide ions in the sol to at least 8 M by adding an alkali metal hydroxide MOH;

d) treating the sol at a temperature in the interval 90-170° C. during 6-72 hours to obtain a plurality of first structures comprising alkali metal titanate; and e) treating the plurality of first structures to exchange at least a part of the alkali metal ions $M^+$ with $H^+$ to obtain a plurality of second structures comprising protonated titanate.

The sol provided in step i) may be obtained by the steps a) and b), optionally followed by steps b1) and b2) and modifications of these steps as described above.

By using a stabilizer in the dispersion obtained after step b, or in the sol obtained after steps b1) and/or b2), or in the sol provided in step i), the surfaces of the $TiO_2$ particles are coated or partially coated by molecules of the stabilizer, and this is believed to keep the particles from irreversible aggregation and condensation via interparticle Ti—O—Ti bond formation particularly as the sols become more and more concentrated during step b2 or in subsequent step c, or at least reduce the probability for aggregation and irreversible condensation. For citric acid as a stabilizer, and similar acidic stabilizers, and for monoethanolamine and similar alkaline stabilizers, the stabilisation of $TiO_2$ dispersions is believed to be both steric and electrostatic, depending upon the solution conditions. In a highly concentrated NaOH dispersion or sol of $TiO_2$ as obtained as disclosed herein, the Debye length for electrostatic stabilisation is likely of such a short length that van der Waals or dispersion forces can aggregate $TiO_2$ particles. It is believed that the surface adsorbed stabilizer molecules stabilize the particles against irreversible formation of interparticle Ti—O—Ti bonds in strong electrolytes where the Debye length is very short due to the steric stabilisation offered by the surface adsorbed citric acid molecules. It is believed that this steric stabilisation allows for faster kinetics of the $TiO_2$ to Na-titanate reaction relative to non-sterically stabilised sols of similar concentration and particle size due to the relative ease of diffusion of reactants into the interparticle spaces.

Moreover, the inventors have discovered that when $TiO_2$ sols obtained by a method as disclosed herein comprising acid or base stabilizers are concentrated to a solid form and then redispersed in water, they reform a sol, where the particle size distribution in the liquid does not change to any noticeable extent. This means that the particles do not irreversibly aggregate. Thus, the stabilizer gives a better and easier redispersion.

An alkanolamine and at least one acidic stabilizer may be added together before step c). If an alkanolamine is added as a stabilizer before step c), then it is preferably added together with at least one acidic stabilizer.

The at least one acidic stabilizer may be at least one selected from a carboxylic acid, and an alpha hydroxy acid.

The at least one acidic stabilizer may comprise at least one selected from the group consisting of, but not limited to citric acid, and lactic acid.

The at least one alkanolamine may be at least one selected from monoethanolamine, triethanolamine. It is believed that the at least one alkanolamine can act as a stabilizer of $TiO_2$ particles in alkaline or basic pH dispersions, thus the at least one alkanolamine may be considered to be a stabilizer of $TiO_2$ basic or alkaline conditions.

The concentration of hydroxide ions may be adjusted in step c) using NaOH, i.e. the alkali metal hydroxide is NaOH.

During step c) or before step d), i.e. during or immediately after adjusting the concentration of hydroxide ions in the dispersion or sol to at least 8 M by adding an alkali metal hydroxide MOH, the dispersion or sol may be stirred and/or agitated and/or sonicated.

When the pH is increased to such a large extent dispersion or the sol often becomes turbid and the viscosity may increase. Stirring and/or agitation and/or sonication is then suitable. Stirring and/or agitation and/or sonication is particularly advantageous for obtaining a homogeneous dispersion or sol during or immediately after step c) when the concentration of the $TiO_2$ dispersion or sol obtained is significantly higher than 15 wt %. It is believed that this stirring of concentrated dispersion or sols with at least 8M NaOH is more effective for obtaining a homogeneous dispersion or sol prior to heating at 90-170° C. compared with stirring powders of pure $TiO_2$ which do not as readily disperse in the same concentration of MOH, such as e.g. NaOH. Nonetheless, stirring and/or agitation and/or sonication is preferred for maximizing the homogeneity of the dispersion during step c).

Stirring may be performed during step d). The stirring is optional and affects the obtained first structures obtained from step d). Stirring in general promotes formation of longer tubes. Additionally, stirring at this stage gives a more homogenous mixture, which in turn gives a more homogenous end material. The stirring during step d) may include mechanical stirring via use of a dedicated stirring reactor vessel or may include agitation of the entire reaction vessel by a rocking or rolling or shaking mechanism or by acoustic waves.

Suitably, the pressure in step d) is autogenous pressure. In other words, the treatment of the sol in step d) is performed at autogenous pressure.

Further, at least step d) may be carried out in a sealable reactor. Autogenous pressure is the pressure that arises in a sealed reactor at a specific fill level and temperature and can be estimated using steam tables and knowledge of the thermophysical properties of the reactants. A sealed vessel is necessary to reach temperatures above the boiling point. Then the pressure is increased compared to ambient pressure. The exact pressure is not critical as long as the desired temperature can be reached.

Alternatively, an open container at ambient pressure may be used for step d) and then it is suitably combined with a reflux vessel to avoid excessive water evaporation.

The plurality of first structures comprising alkali metal titanate obtained after step d) may be separated from the remaining liquid between steps d) and e). This can be performed by filtration or by other means such as centrifugation. Water may be added to the separated comprising alkali metal titanate after the separation.

Suitably, the plurality of first structures comprising alkali metal titanate obtained after step d) are separated from the mother liquor by a method that is not limited to, for example filtering before step e).

The alkali metal cations $M^+$ of the first structure comprising alkali metal titanate obtained after step d) may be exchanged with $H^+$ to a ratio Ti/M calculated by atomic percent of 6 or above. This is performed during step e) and results in a second structure comprising protonated titanate. The ratio is measured in the second structure or subsequently formed third structure.

A second structure obtained after the ion exchange in step e) often comprises stacked layers. During the ion exchange the stacked layers do not appear to fully delaminate to single layers, but can continue towards full demimation. If a high Ti/M ratio is used, then the delamination proceeds towards a more complete state during heating when the third structure comprising titanium dioxide is obtained. During the ion exchange in step e) some delamination of stacked layers occur and this process continues during the subsequent heating of step f). The evidence from FIG. 17 indicates the process is greatly facilitated if a Ti/M ratio of 6 or above is used.

The plurality of second structures comprising protonated titanate obtained after step e) are suitably separated from the mother liquor by for example filtration after step e). Separation using combinations of relative timing, including separation before, during and after step e) are also envisaged. During such a separation the structures can be recovered and at least partially redispersed in an aqueous solution.

The plurality of second structures comprising protonated titanate obtained after step e) may be heated in an optional step f) to a temperature in the range 300-700° C., preferably 300-600° C., more preferably 300-450° C., most preferably 300-400° C. to obtain a plurality of third structures comprising titanium dioxide.

The third structures typically comprise at least one selected from the group consisting of sheets, wires and tubes. The third structures may comprise $TiO_2(B)$.

The heating in step f) both provides $TiO_2(B)$ and removes organic impurities such as a stabilizer.

If it is desired to remove the stabilizer entirely step f) should preferably be performed in air or with other agents known to aid oxidation.

In some instances it may be desirable to heat the first or second structures comprising alkali or protonated titanate in an atmosphere and temperature such that the said heating results in formation of a carbon-$TiO_2(B)$ hybrid, for example when properties such as conductivity is desired to be combined at an intimate molecular level, such as for the manufacture of Li-ion battery anodes, where a conductive material comprises the anode along with other components including a lithiated $TiO_2$ (B).

The third structure comprises titanium dioxide and is obtained in step f) wherein the second structure is heated to a temperature in the range 300-700° C., preferably 300-600° C., more preferably 300-600° C., most preferably 300-450° C., even more preferably 300-400° C. The Ti/M ratio is calculated by taking the atomic % of Ti in the second or in the third structure, (the said atomic ratio is assumed to be stable on going from the second to third structure, so it can be measured in either one) and dividing it by the atomic % of the M in the respective second or third structure. A ratio above 6 as can be seen in FIG. 9 to correlate with a higher specific surface area after heating. Without wishing to be bound by any particular scientific theory, the inventors believe that a higher Ti/M facilitates delamination of stacked layers during acid exchange of $M^+$ by $H^+$ on going from layered alkali metal titanate (e.g. sodium titanate) to layered protonated titanates. This delamination of stacked layers for such relatively low $M^+$-containing second structures may continue to occur during heating of the second structures to the third structures, as indicated by the decrease in intensity of the (002) XRD peak on going from 110° C. to 350° C. seen in FIGS. 1, 3, 5 and 7. Some of the structures obtained after step c) comprise stacked layers.

The first, second and third structures denote mutually distinct structures. The first and second structures are typically compositionally distinct layered titanates, because the alkali metal ions $M^+$ of the first structure are replaced, at least partially, by $H^+$ in the second structure, typically yielding a different $d_{(200)}$ crystallographic spacing between layers, and often less intensity and more broadening of the XRD peaks indicative of relatively smaller or less well ordered crystallographic arrangements of the atoms, at least in part due to delamination and curvature induction.

The third structure is distinct from the first and second structures since it has undergone substantial dehydration, layer condensation and atomic rearrangements to form at least a fraction of $TiO_2$(B), which can be stable in thin sheets, tubes, wires and other nanostructured forms, but does not have a formally layered crystal structure as do the first two structures whose Ti and O atoms are not bonded across the layer space.

The present disclosure also provides an intermediate product obtained after step b), b1) and/or b2), said intermediate product being a dispersion or sol of particles comprising $TiO_2$ and comprising at least one acidic stabilizer. The intermediate product is a dispersion or sol of particles comprising $TiO_2$ and the first, second and third structures obtainable by a method according to the present disclosure are made of such particles.

The intermediate product obtained after step b), b1) and/or b2) can be stored, transported and handled easily before the structures such as sheets, tubes and wires are made. This intermediate product can be stored for extended periods such as weeks to years, making a large scale process easier.

The pH of the intermediate product may be in the range 0.5-9.

The intermediate product may comprise at least 15 wt % $TiO_2$, preferably at least 17 wt % $TiO_2$, more preferably at least 25 wt % $TiO_2$, even more preferably at least 30 wt % $TiO_2$, preferably at least 50 wt % $TiO_2$, and most preferably at least 50 wt % $TiO_2$. Up to slightly in excess of 40 wt %, it is still a sol. If ion removal is performed in step b1, the resulting sol can have over 50 wt % $TiO_2$.

The intermediate product obtained from step b, b1) and/or b2) may be concentrated by drying under vacuum so that the concentration of titanium dioxide is at least 50 wt %.

The concentration of titanium dioxide in the intermediate product obtained after steps b) b1) and/or b2) may be at least 70 wt %. In such cases the intermediate product is viscous sol.

The specific surface area measured according to ISO 9277 of the $TiO_2$ particles dried from the dispersion of the intermediate product obtained after steps b) b1) and/or b2) is in the range 200-300 $m^2$/g.

The present disclosure also provides a third structure comprising titanium dioxide, said third structure being one of a sheet, a wire, and a tube, said structure obtained after step f) as described above.

The third structure may comprising sheets, wires and tubes may constitute a part of a lithium ion battery anode. Advantages of using said third structures of $TiO_2$(B) comprising sheets, wires and tubes is the ability for Li ions to readily insert/extract in/from the open framework in the $TiO_2$(B) unit cell at a concentration up to an atomic Li/Ti ratio maximum of 1 with little change to the crystal structure. This in part allows inherently and relatively fast charge and discharge rate compared with typical graphite anodes used in Li ion batteries, and with an attractive theoretical capacity of 335 $mAh \cdot g^{-1}$. Further, this very low expansion and contraction of the bronze unit cell during Li transport in and out of the $TiO_2$(B) crystals during charging and discharging respectively equates with enhanced dimensional stability of an anode comprising $TiO_2$(B). This is evident by looking at the state of the art on lithium $TiO_2$(B) crystal structures—for example in Armstrong et al., Chemistry of Materials 22, 6426-6432 (2010) where they reported crystal structures of lithium-free $TiO_2$ (B), $Li_{0.25}TiO_2$ (B) $Li_{0.5}TiO_2$ (B), $Li_{0.8}TiO_2$ (B) and $Li_{0.9}TiO_2$ (B). The volume of the unit cell expands up to a maximum 8.4% over the structure of bulk, lithium-free $TiO_2$ (B). The dimensional stability of $TiO_2$(B) as an anode material during charging and discharging is an attractive feature that can equate to enhanced long term cycling stability and significantly longer battery lifetimes.

Additionally, said third structures comprising titanium dioxide sheets, tubes or wires can form a network when a plurality of individual structures is condensed to a solid material, such as in a film of finite thickness. Further, such networks of a plurality of said third structures of $TiO_2$, can comprise a significant interconnected mesopore network between the individual structures making up the plurality of individual structures.

Further, the third structures comprising titanium dioxide sheets, tubes or wires can form a network with relatively long conductive paths combined with relatively short transport paths from Li ion binding sites in the crystals from the electrolyte all of which enhance the kinetics and capacity of the anode relative to one comprised of uniformly dimensioned particles of the same crystal structure.

To make an anode from the said third structures comprising titanium dioxide sheets, tubes or wires it may be desirable to form a network comprising a plurality of individual structures condensed to a solid material, such as in a film of finite thickness, the said network also comprising a significant interconnected mesopore network between the individual structures making up the plurality of individual structures. Such a desirable network structure in the form of a film can be made from previously undried suspensions of second structures comprising protonated titanates, obtainable after step e) of the method disclosed herein, by a variety of methods including casting, blade coating, spin coating, spraying, electrospraying, dipping onto various substrates including metal foils, and then subjecting the said film to step f) as disclosed herein to form a third structure comprising titanium dioxide and selected from the group consisting of sheets, a wires and tubes. Such a desirable network structure can alternatively be formed by subjecting previously constructed films of $TiO_2$ nanoparticles to one or more of the steps c-f disclosed herein.

Together the said advantages of using third structures of $TiO_2$(B) comprising sheets, tubes or wires to comprise an anode in a Li ion battery include fast charge and discharge rates, high current capacity, high dimensional stability, long term cycling performance and long battery lifetime.

The structure of a titanium compound manufactured according to the steps disclosed herein may constitute a part of an anode of an all solid state lithium ion battery. The structure may be a sheet, tube or wire.

The structure of a titanium compound manufactured according to the steps disclosed herein may constitute a part of an anode of a solid state lithium ion microbattery. The structure may be a sheet, tube or wire.

The structure of a titanium compound manufactured according to the steps disclosed herein may constitute a part of an anode of a solid state battery. The structure may be a sheet, tube or wire.

The structure of a titanium compound manufactured according to the steps disclosed herein may constitute a part of an anode of a lithium sulfur battery. The structure may be a sheet, tube or wire.

The structure of a titanium compound manufactured according to the steps disclosed herein may constitute a part of an anode of a lithium oxygen battery. The structure may be a sheet, tube or wire.

The structure of a titanium compound manufactured according to the steps disclosed herein may constitute a part of an anode sodium ion battery. The structure may be a sheet, tube or wire.

A carbon hybrid structure of a titanium compound manufactured according to the steps disclosed herein may constitute a part of an anode of an alkali metal ion battery. The structure may be a sheet, tube or wire.

The structure of a titanium compound manufactured according to the steps disclosed herein may constitute a part of a photocatalytic object or device. The structure may be a sheet, tube or wire.

The intermediate product obtained after steps b, b1 or b2 may constitute part of a photocatalytic object or device or is used as a precursor dispersion for making said photocatalytic object or device.

The intermediate product obtained after steps b, b1 or b2 may constitute part of an anode of a lithium ion battery or may be used as a precursor dispersion for making said anode of a lithium ion battery.

In an alternative of the first aspect there is provided a method for manufacturing a structure of a titanium compound selected from the group consisting of sheets, wires and tubes, the method comprising the steps of:

- ab) providing a dispersion of particles comprising $TiO_2$, wherein the average diameter of the particles in the dispersion is 3-20 nm, preferably 4-15 nm, more preferably, 4.5-7 nm, and wherein the dispersion comprises at least one alpha hydroxy acid as acidic stabilizer,
- c) adjusting the concentration of hydroxide ions in the dispersion from step ab) to at least 8 M by adding an alkali metal hydroxide MOH,
- d) treating the dispersion from step c) at a temperature in the interval 90-170° C. during 6-72 hours to obtain a plurality of first structures comprising alkali metal titanate,
- e) treating the plurality of first structures comprising alkali metal titanate to exchange at least a part of the alkali metal ions $M^+$ with $H^+$ to obtain a plurality of second structures comprising protonated titanate.

In one embodiment of the alternative aspect, the dispersion after step ab) comprises at least 15 wt % titanium dioxide, preferably at least 17 wt % titanium dioxide, more preferably at least 25 wt % titanium dioxide, even more preferably at least 30 wt % titanium dioxide, and even more preferably at least 40 wt % titanium dioxide, and most preferably at least 50 wt % titanium dioxide.

In one embodiment of the alternative aspect, the plurality of second structures comprising protonated titanate obtained after step e) are heated to a temperature in the range 300-700° C., preferably 300-600° C., more preferably 300-450° C., most preferably 300-400° C. to obtain a plurality of third structures comprising titanium dioxide.

In one embodiment of the alternative aspect, at least one alkanolamine and at least one acidic stabilizer are added together before step c).

In one embodiment of the alternative aspect, the carboxylic acid is selected from the group consisting of citric acid, and lactic acid.

In one embodiment of the alternative aspect, stirring is performed during step d).

In one embodiment of the alternative aspect, the dispersion has remained in a dispersed state without drying and subsequent redispersion between steps ab) and c).

In one embodiment of the alternative aspect, the dispersion is dried and redispersed between steps ab) and c).

In one embodiment of the alternative aspect, the specific surface area, as measured according to ISO 9277 of the particles dried from the dispersion obtained after step ab), is in the range 200-300 $m^2/g$.

In one embodiment of the alternative aspect, the pH of the dispersion resulting from step ab) is adjusted to a value in the range 0.5-1.5.

In one embodiment of the alternative aspect, the concentration of hydroxide ions is adjusted in step c) using NaOH.

In one embodiment of the alternative aspect, the plurality of first structures comprising alkali metal titanate are separated from the remaining liquid between steps d) and e).

In one embodiment of the alternative aspect, the treatment of the dispersion in step d) is performed at autogenous pressure.

In one embodiment of the alternative aspect, no transition metal ions except titanium are added.

In an alternative of the second aspect there is provided structure comprising titanium dioxide, said structure being one of a sheet, a wire, and a tube, said structure being made according to the method outlined above.

In one embodiment of the alternative aspect, the structure constitutes a part of a Li ion or sodium ion battery anode.

In one embodiment of the alternative aspect, the structure constitutes a part of a photocatalytic object.

In one embodiment of the alternative aspect, the structure constitutes a surface modification or treatment of a titanium dental or bone implant.

Given the alternative it can be seen that in the first aspect there is either performed the consecutive steps a) and b), or alternatively there is provided the step ab). As detailed above the steps a) and b) are method steps to obtain a dispersion of particles comprising $TiO_2$. As described above the step ab) is a step of providing particles comprising $TiO_2$, and which particles have certain properties.

Thus, the first aspect can also be expressed as a method for manufacturing a structure of a titanium compound selected from the group consisting of sheets, wires and tubes, the method comprising the steps of: performing one of:

- i) the consecutive steps a) and b) or
- ii) the step ab), before performing the consecutive steps c), d), and e),
  - a) providing at least one titanic acid with the general formula $[TiO_x (OH)_4\text{-}\mathbf{2}_x]n$ and dissolving it in an aqueous solution comprising at least one compound selected from the group consisting of $TiOCl_2$, $TiCl_4$, and HCl so that a clear solution is obtained, wherein the pH of the clear solution is lower than 1 after dissolution,
  - b) increasing the temperature of the clear solution until reaching a temperature in the interval 68-85° C. where precipitation starts to occur, adding at least one acidic stabilizer before the precipitation starts to occur, and holding that temperature during at least 1 minute during stirring to obtain a dispersion of particles comprising $TiO_2$ as an intermediate product,
- ab) providing a dispersion of particles comprising $TiO_2$, wherein the average diameter of the particles in the dispersion is 3-20 nm, preferably 4-15 nm, more preferably, 4.5-7 nm, and wherein the dispersion comprises at least one alpha hydroxy acid as acidic stabilizer,
  - c) adjusting the concentration of hydroxide ions in the dispersion from step b) to at least 8 M by adding an alkali metal hydroxide MOH, d) treating the dispersion from step c) at a temperature in the interval 90-170° C. during 6-72 hours to obtain a plurality of first structures comprising alkali metal titanate, e) treating the plurality of first structures comprising alkali metal titanate to exchange at least a part of the alkali metal ions $M^+$ with $H^+$ to obtain a plurality of second structures comprising protonated titanate.

All embodiments as described above are also applicable when the invention is described in this way.

Theoretically, LTO (Lithium titanate, $Li_4Ti_5O_{12}$) has a working voltage of 1.55 V with specific capacities of 175 mAh/g according to Priyono et al in AIP Conference Proceedings 1826, 020005 (2017). 175 mAh/g is thus an important threshold for anodes (electrodes) comprising $TiO_2$.

In yet another aspect there is provided an electrode component for a lithium-ion battery, the electrode component comprises a structure manufactured according to the method as described above.

In a further aspect there is provided a lithium-ion electrochemical cell comprising a first electrode and a second electrode separated by an electrolyte, wherein one of the first and second electrolytes comprises a structure manufactured according to the method as described above.

In one embodiment the charge capacity in a half-cell test is above 175 mAh/g.

In a further aspect there is provided a lithium-ion battery comprising a plurality of electrochemically linked lithium-ion electrochemical cells, wherein each of the lithium-ion electrochemical cells comprises a first and a second electrode separated by an electrolyte, wherein one of the first and second electrolytes comprises a structure manufactured according to the method as described above.

In one embodiment of the battery the charge capacity in a half-cell test is above 175 mAh/g.

In one embodiment the battery can be charged at a rate of 5 C. In one embodiment the battery can be charged at a rate of 10 C. In this respect the C-rate is a measure of the rate at which a battery can be charged relative to its maximum capacity. A 1 C rate means that the current will charge the entire battery in 1 hour. A 5 C rate means that the current will charge the entire battery in ⅕ hour. A 10 C rate means that the current will charge the entire battery in 1/10 hour.

In one embodiment of the lithium-ion electrochemical cell or the lithium-ion battery has a Coulombic efficiency greater than 99.5% after 100 cycles. The Coulombic efficiency is the efficiency with which charge is transferred in a system facilitating an electrochemical reaction. In this case it is measured after 100 cycles in order to avoid effects when using a completely new electrochemical cell.

In one embodiment the capacity recovery for C/10 charging is at least 90% after charging and discharging at C/10, C/3, C/2, 1C, 2 C, 5 C, 10 C and C/10 again for 5 cycles each, wherein 1 C is defined as 330 mA/g, and wherein the measurement is made for the $3^{rd}$ cycle of the C/10 charging. Charging and discharging cycles are performed at C/10 and then the high rate cycling is made, whereafter the same C/10 charging and discharging cycles are made. Then 90% or more of the capacity is still present.

EXAMPLES

The invention is further described by the following examples.

Example 1. An acidic, 10 wt % $TiO_2$ dispersion of pH<1 was prepared according to step a) and step b), by mixing 2.5 parts of titanic acid suspended in water with 1 part of $TiOCl_2$ solution (22-24 wt % $TiO_2$, density 1.5-1.6 g·cm$^{-3}$) to obtain a clear solution (step a)) and adding citric acid as stabilizer in mass ratio of 10:1 $TiO_2$:citric acid prior to raising the temperature to 80° C. and holding for 75 minutes (step b)) and subsequent rapid cooling. The said titanic acid suspended in water was pH 5.5 and was prepared before step a) by mixing 2 parts of said $TiOCl_2$ solution with 1 part of water and 8.8 parts 10% NaOH, keeping the temperature in the range 25-40° C. In this example, the ratio of two masses, i.e., the mass of Ti in the aqueous $TiOCl_2$ solution used to prepare the titanic acid suspended in water and the mass of Ti in the aqueous solution of $TiOCl_2$ that was mixed with titanic acid in step a) to form a clear solution was 3:7.

After step b), the ion and water content were adjusted (steps b1) and b2)) to pH 1 to 1.5 and 20 wt % $TiO_2$ so that an acidic sol of $TiO_2$ was obtained.

Example 2. An alkaline sol of pH 8.5-9.0 with 15 wt % $TiO_2$ was prepared before step c) by taking the 20 wt % acidic sol of pH 1 to 1.5 of Example 1 and adding citric acid, KOH and monoethanolamine (MEA) with stirring. To 6.1 parts of the acidic sol the following were added—1 part of a basic solution comprised of 1.8 parts water, 1.8 parts of KOH (49 wt %) and 1.0 parts citric acid. MEA was added so the final mass of the final alkaline sol had a mass ratio of citric:MEA of 2.1:1.

Example 3. The acidic dispersion obtained after step step b) in Example 1 was concentrated (step b2)) with respect to $TiO_2$ content by differential density separation, such that from the 2.2 parts by weight of the dispersion obtained after step b), 1.0 part of a clear liquid was removed, the said clear liquid being substantially free of $TiO_2$ particles, leaving 1.2 parts comprising $TiO_2$ particles as a concentrated white paste and residual clear mother liquor. Following this concentration step, the said 1.2 parts was then diluted with the said 1.0 parts of water which corresponds to step b1, whereby a total of 2.2 parts of an ion-reduced acidic dispersion of $TiO_2$ was obtained with pH<0.

Example 4. An acidic dispersion of 20 wt % $TiO_2$ was obtained by subjecting the said ion-reduced dispersion of $TiO_2$ from Example 3 to diafiltration (step b1)) and ultrafiltration (step b2)), where the said 2.2 parts of ion-reduced acidic dispersion of example 3 plus 1.4 parts of water were added as inputs to obtain 0.7 parts of 20 wt % $TiO_2$ acidic sol of pH 1-1.5 and 2.7 parts produced water.

Example 5. The acidic sol from example 4 was evaporated to a solid form under vacuum (step b2)) so that the said solid form was redispersible in water such that a stable $TiO_2$ sol was thereby obtained. The weight percentage of $TiO_2$ in the sol formed by redispersing the said solid could be tuned by varying the ratio of water to said solid. In this case a final sol of 40 wt % $TiO_2$ was obtained from redispersing the said solid.

Example 6. The alkaline sol of Example 2 was evaporated under vacuum while heating at 60° C. (step b2)) to obtain a sol with a $TiO_2$ content>15%. In this way the said alkaline sol of Example 2 was concentrated to 37 wt % $TiO_2$.

Example 7. The said alkaline sol of Example 6 was diluted with water to obtain a sol of 30 wt % $TiO_2$.

Example 8. The 20 wt % $TiO_2$ sol of example 1 was pH adjusted with 10 M NaOH (step c)) according to the amounts and conditions of Exp #JAT-1-019 of Table 1. Explicitly, 0.477 g of said sol was well mixed with 0.19 g of 10 M NaOH (step c)) and was heated under autogeneous pressure in a Teflon-lined steel autoclave at 130° C. for 24 hours (step d)) to form a sodium titanate product. This product was then ion exchanged with 0.1 M HCl (step e)), washed and dried in air at room temperature. The said product was characterised using transmission electron microscopy (TEM) and the results appear in Table 2.

Example 9. A 15 wt % $TiO_2$ sol prepared according to Example 2 was used as a reactant along with 2-15 M NaOH (step c)) according to the amounts and conditions given in Table 1 for all experiments where the entry in the column marked '% $TiO_2$ in sol' is stated as 15%. As in Example 8, the reactants for each experiment were mixed and heated (step d)) in an autoclave under the conditions given in Table 1 to produce sodium titanate products. The said sodium titanate products were then ion exchanged (step e)) to obtain protonated titanates, then washed and dried in air at room temperature and split into fractions that were subsequently heated to either 110° C. in air for 2.5 hours or 110° C. in air for 2.5 hours followed by heating in air to 350° C. for 2.5 hours (step f)). The said products were then characterised by one or more of the following: X-ray powder diffraction (XRD), Raman spectroscopy, nitrogen physisorption scanning electron microscopy (SEM), transmission electron microscopy (TEM), energy dispersive x-ray analysis (EDX) or thermogravimetric analysis (TGA).

Example 10. A 37 wt % $TiO_2$ sol prepared according to Example 6 was used as a reactant along with 10 M NaOH (step c)) according to the amounts and conditions given in Table 1 for all experiments where the entry in the column marked '% $TiO_2$ in sol' is stated as 37%. As in Examples 8 and 9, the reactants for each experiment were mixed and heated in an autoclave under the conditions given in Table 1 to produce sodium titanate products (step d)). The products were subsequently treated by the same processes (step e), heating at 110° C. and step f)) and characterisation methods as the products of Examples 8 and 9 after being removed from their respective reaction vessels.

Example 11. A 30 wt % $TiO_2$ sol prepared according to Example 6 was pH adjusted with 10 M NaOH (step c)) according to the amounts and conditions given in Table 1 for all experiments where the entry in the column marked '% TiO2 in sol' is stated as 30%. As in Examples 8, 9 and 10, the reactants for each experiment were mixed (step c)) and heated in an autoclave (step d)) under the conditions given in Table 1 to produce sodium titanate products. The products were subsequently treated by the same processes (steps e), heating at 110° C. and f)) and characterisation methods as the products of Examples 8, 9 and 10 after being removed from their respective reaction vessels.

Example 12. 2.8969 mg of sample RWC-1-24 obtained after step e) (see Table 1) was heated at 110° C. for 2.5 hours in air and subsequently subjected to thermogravimetric analysis (TGA) where it was heated at 20° C. per minute from room temperature to 500° C. in flowing nitrogen gas, and the weight loss recorded as 17.2%. The sample after heating was a black powder indicative of the formation of carbon-$TiO_2$(B) hybrid material comprising tubes, where the carbon was sourced from the residual organics remaining after formation, washing and drying of the protonated titanates in this sample.

FIG. 1 shows X-ray powder diffraction (XRD) patterns corresponding to the product of heat treating (i.e. step f)) the plurality of second structures obtained from experiment RWC-1-018 of Tables 1 and 2. Both patterns are indexed according to a monoclinic titanate crystal structure of composition $(H, Na)_2Ti_3O_7$, following the indexing given in Carvahlo et al., Chemical Engineering Journal 313 (2017) 1454-1467. The peaks labelled with an asterisk in the upper pattern are indexed to $TiO_2$(B), according to the indexing given in Etacheri et al., ACS Nano 8(2) 1491-1499 (2014). Note that the (110) and (020) peaks are common to both structures. The relative area under the (200) or (001*) peaks is taken as an indicator of the degree of delamination (de-stacking) of the sheet structure (or the $TiO_2$(B) sheets/tube walls formed from it, so that any peak intensity is taken to indicate some degree of stacking of the titanate phase or the relative thickness of the $TiO_2$(B) sheet formed from it. The relative level of stacking of layers (or $TiO_2$(B) sheet thickness) can be compared between this and other samples in Table 2. Thinner $TiO_2$(B) sheets are desirable in some cases where a higher specific surface area is desirable. As is seen in Table 2, and in FIG. 9, larger peaks (corresponding to thicker $TiO_2$(B) sheets/tube walls) correlate with lower BET areas, and that the highest BET specific surface areas are obtained when the Ti/Na atomic ratio is highest. This implies that delamination of the titanate sheets is more effective when the ion exchange process (i.e. step e)) removes enough Na so that the Ti/Na atomic ratio is approximately larger than 6. Below this level, stacks of titanates remain and form thicker bronze sheets with lower specific surface area. As shown in Table 2, this sample shows low sodium indicative of a high degree of ion exchange to protons (hydronium ions) during step e).

Figure 2:
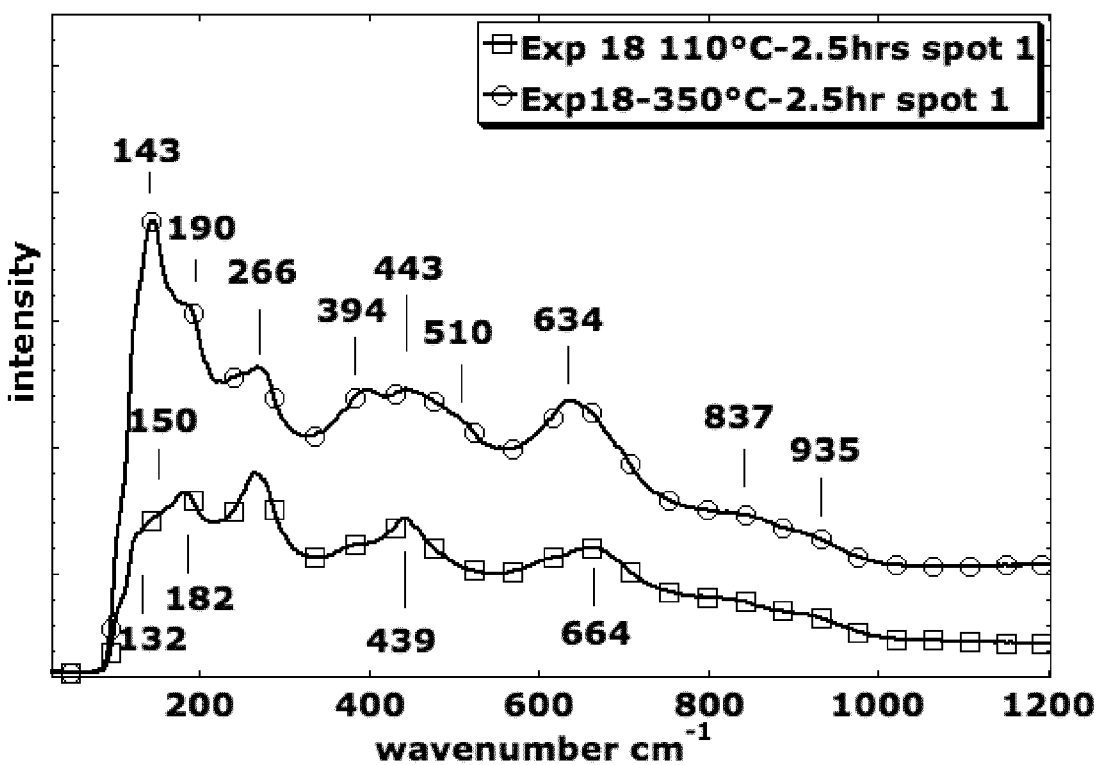
FIG. 2 shows Raman spectra of the same samples in FIG. 1.

FIG. 2 shows Raman spectra of the same samples in FIG. 1. In the case of these and the other Raman spectra shown herein, the spectra are taken not from the whole sample but from 5-10 micrometer spots within the sample and some variation occurs, consistent with some local variation possibly due to different polymorphs of the titanate. The lower curve at 110° C. is assigned to a titanate structure in accordance with the assignments of Carvahlo et al., Chemical Engineering Journal 313 (2017) 1454-1467. The upper curve is assigned to a $TiO_2$(B) structure according to the assignments of Feist et al., Journal of Solid State Chemistry 101, 275-295 (1992).

Figure 3:
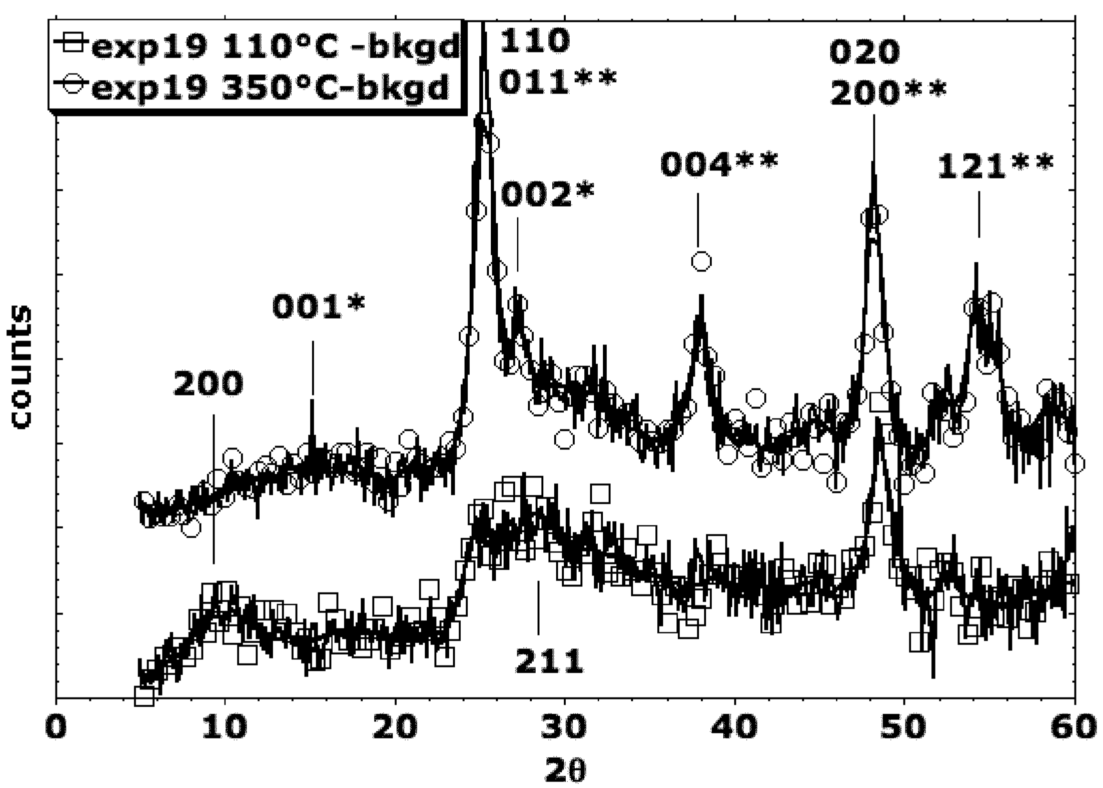
FIG. 3 shows X-ray powder diffraction (XRD) patterns corresponding to the product of heat treating the plurality of second structures obtained from experiment RWC-1-019 of Tables 1 and 2.

FIG. 3 shows X-ray powder diffraction (XRD) patterns corresponding to the product of heat treating (step f)) the plurality of second structures obtained from experiment RWC-1-019 of Tables 1 and 2. Both patterns are indexed according to a monoclinic titanate crystal structure of composition $(H,Na)_2Ti_3O_7$, following the indexing given in Carvahlo et al., Chemical Engineering Journal 313 (2017) 1454-1467. In addition, peaks with single asterisks mark the expected position of $TiO_2$(B) peaks and those with double asterisks mark the positions expected for $TiO_2$ anatase. The lower curve is consistent with titanate. The upper pattern is consistent with $TiO_2$(B) that is transitional to, or co-mixed with $TiO_2$ anatase. The presence of anatase is also indicated in FIG. 4.

Figure 4:
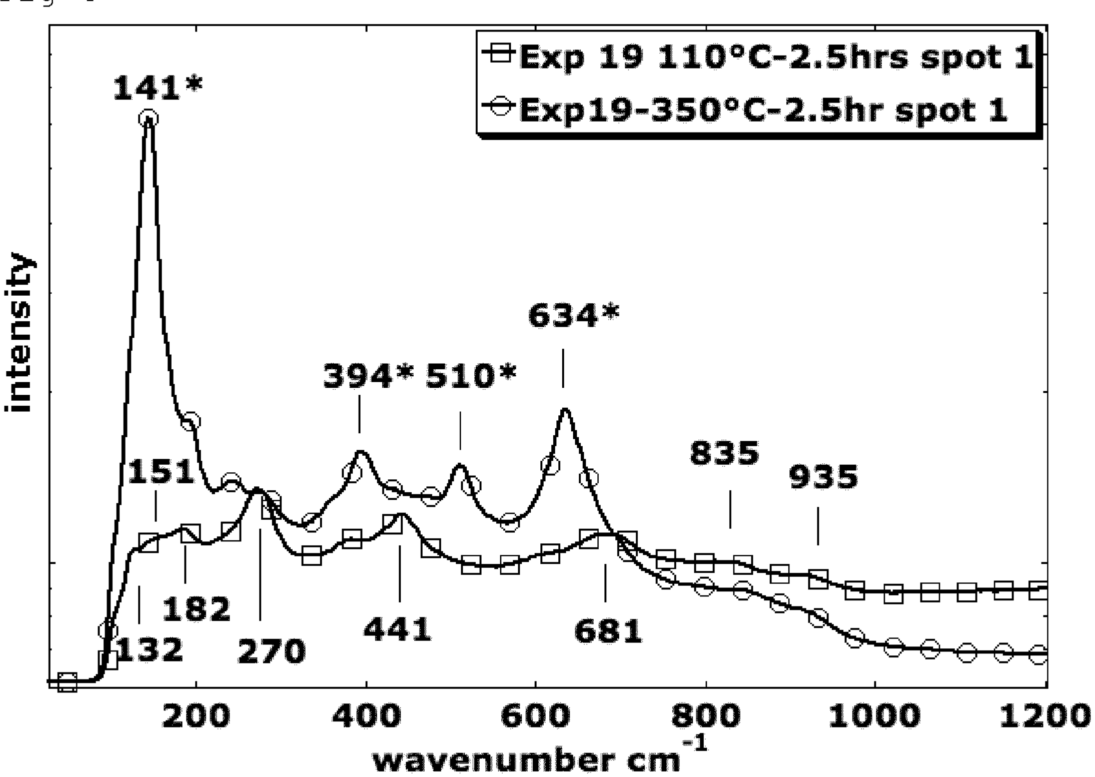
FIG. 4 shows Raman spectra of the same samples in FIG. 3.

FIG. 4 shows Raman spectra of the same samples in FIG. 3. The lower curve at 110° C. is assigned to a titanate structure in accordance with the assignments of Carvahlo et al., Chemical Engineering Journal 313 (2017) 1454-1467. The upper curve is assigned to $TiO_2$ anatase.

FIG. 5 shows X-ray powder diffraction (XRD) patterns corresponding to the product of heat treating (step f)) the plurality of second structures obtained from experiment RWC-1-022 of Tables 1 and 2. Both patterns are indexed according to a monoclinic titanate crystal structure of composition $(H,Na)_2Ti_3O_7$, following the indexing given in Carvahlo et al., Chemical Engineering Journal 313 (2017) 1454-1467. In addition, peaks with single asterisks mark the expected position of $TiO_2$(B) peaks. The lower curve is consistent with titanate. The upper pattern is consistent with $TiO_2$ (B).

FIG. 6 shows Raman spectra of the same samples in FIG. 5. The lower curve at 110° C. is assigned to a titanate structure in accordance with the assignments of Carvahlo et al., Chemical Engineering Journal 313 (2017) 1454-1467. The upper curve is assigned to a titanate that is barely transitional to $TiO_2$ (B) structure according to the assignments of Feist et al., Journal of Solid State Chemistry 101, 275-295 (1992), in particular we believe this is indicated by the increasing intensity of the peaks at 126, 151 and 383 $cm^{-1}$ and the onset of broadening of the peaks at 448 and 660 $cm^{-1}$.

Figure 7:
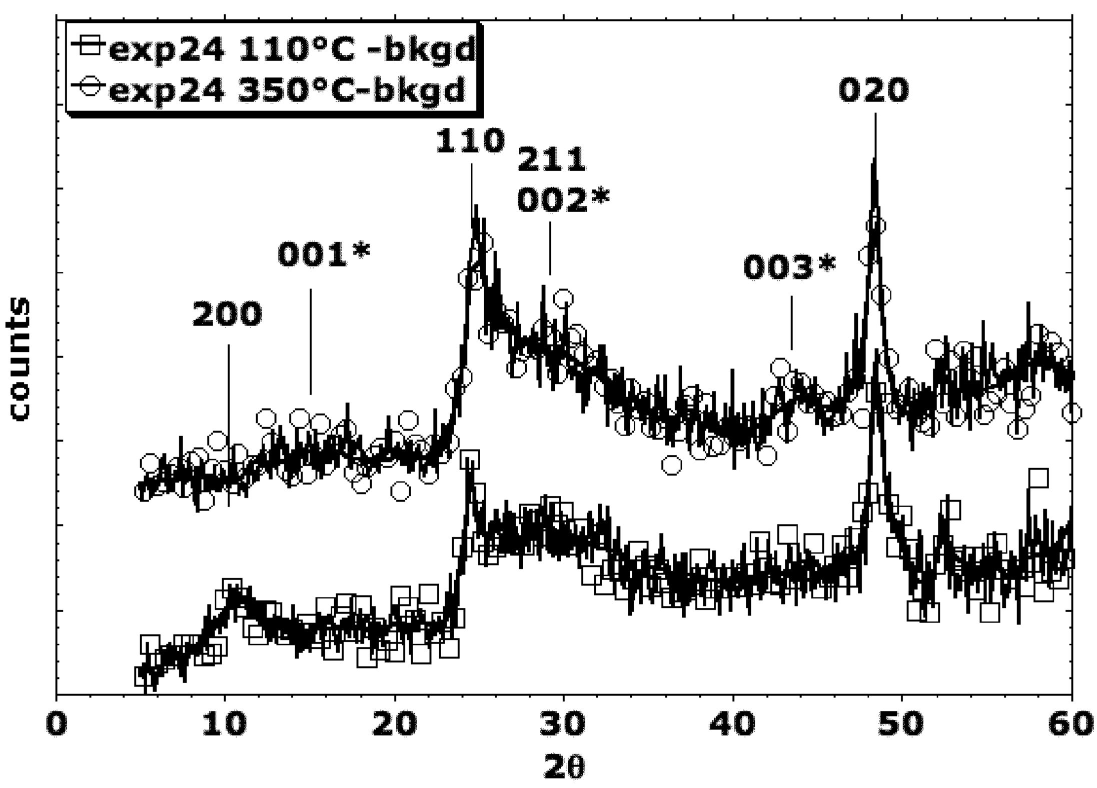
FIG. 7 shows X-ray powder diffraction (XRD) patterns corresponding to the product of heat treating the plurality of second structures obtained from experiment RWC-1-024 of Tables 1 and 2.

FIG. 7 shows X-ray powder diffraction (XRD) patterns corresponding to the product of heat treating (step f)) the plurality of second structures obtained from experiment RWC-1-024 of Tables 1 and 2. Both patterns are indexed according to a monoclinic titanate crystal structure of composition $(H,Na)_2Ti_3O_7$, following the indexing given in Carvahlo et al., Chemical Engineering Journal 313 (2017) 1454-1467. In addition, peaks with single asterisks mark the expected position of $TiO_2$(B) peaks. The lower curve is consistent with titanate. The upper pattern is consistent with $TiO_2$ (B). Note that the 001 peak of $TiO_2$ (B) in the upper curve is approaching zero, consistent with an approach to complete delamination of the titanate as it converts to thin $TiO_2$(B) sheets, consistent with the high surface area of this sample.

Figure 8:
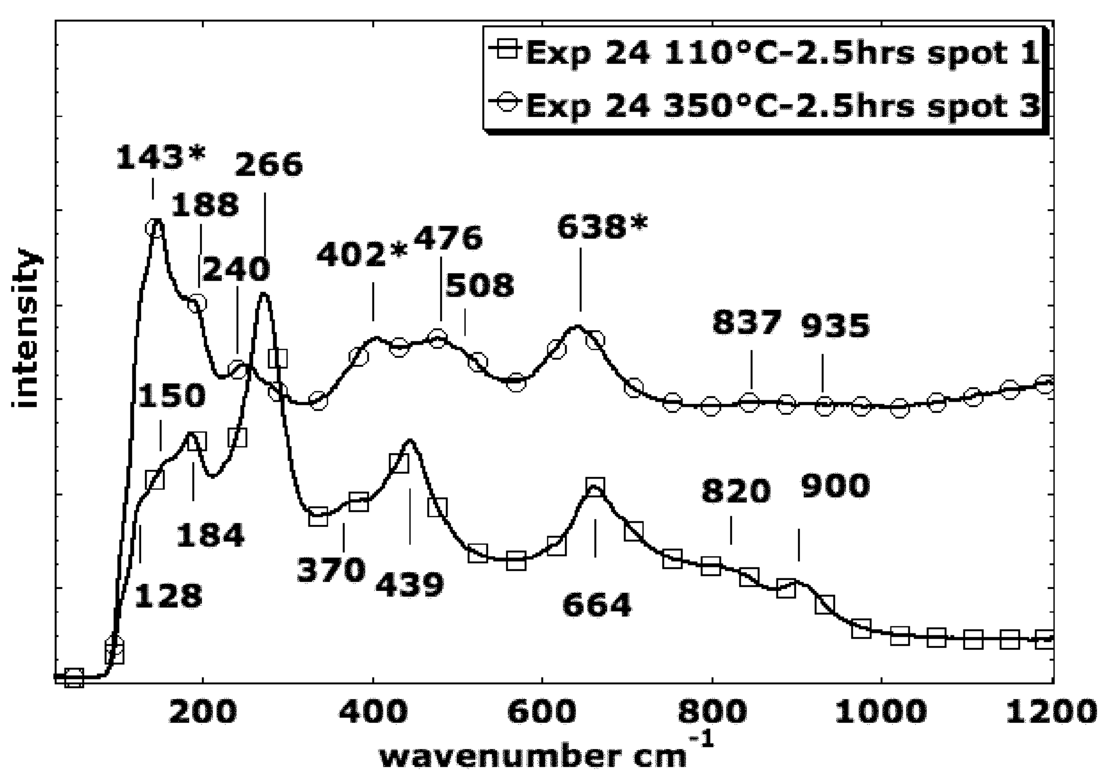
FIG. 8 shows Raman spectra of the same samples in FIG. 5.

FIG. 8 shows Raman spectra of the same samples in FIG. 5. The lower curve at 110° C. is assigned to a titanate structure in accordance with the assignments of Carvahlo et al., Chemical Engineering Journal 313 (2017) 1454-1467. The upper curve is assigned to $TiO_2$(B) structure according to Feist et al., Journal of Solid State Chemistry 101, 275-295 (1992).

FIG. 9 shows the Ti/Na ratio measured from EDX (see Table 2) versus the BET surface area of the 350° C. treated samples, as discussed in the caption to FIG. 1. There appears to be a correlation between a high degree of delamination, as indicated by high surface areas and the ratio of Ti/Na measured in the ion exchanged product. It appears that achieving relatively higher degrees of delamination occurs above a Ti/Na ratio of approximately 6. Note that the data point with a surface area close to 200° C. can be considered an outlier here, since its crystal structure is $TiO_2$ anatase, whereas all the other data points correspond to $TiO_2$(B)

FIG. 10 shows an SEM image of sample RWC-1-005, with well formed elongate aggregated clusters of tubes/rods forming a porous solid.

Figure 11:
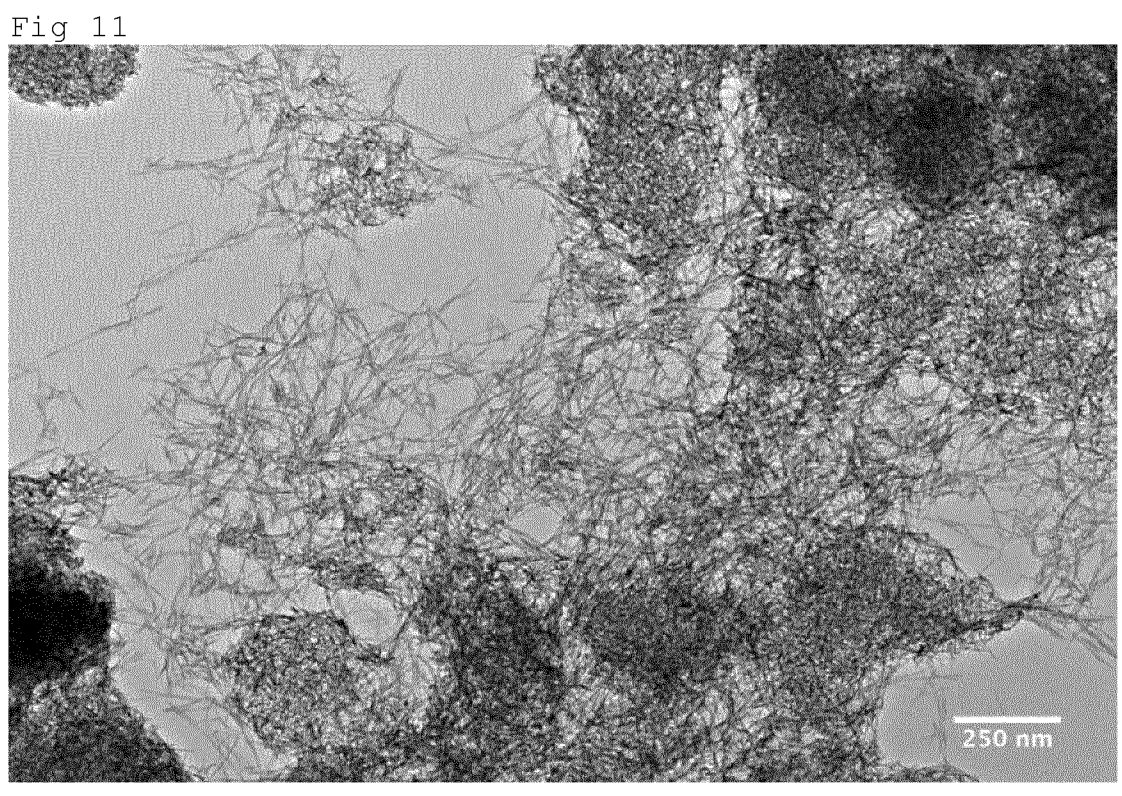
FIG. 11 shows a TEM image of sample RWC-1-005, with well formed tubes forming an open structured web or network of varying degrees of compactness likely induced by the TEM sample preparation.

FIG. 11 shows a TEM image of sample RWC-1-005, with well formed tubes forming an open structured web or network of varying degrees of compactness likely induced by the TEM sample preparation.

Figure 12:
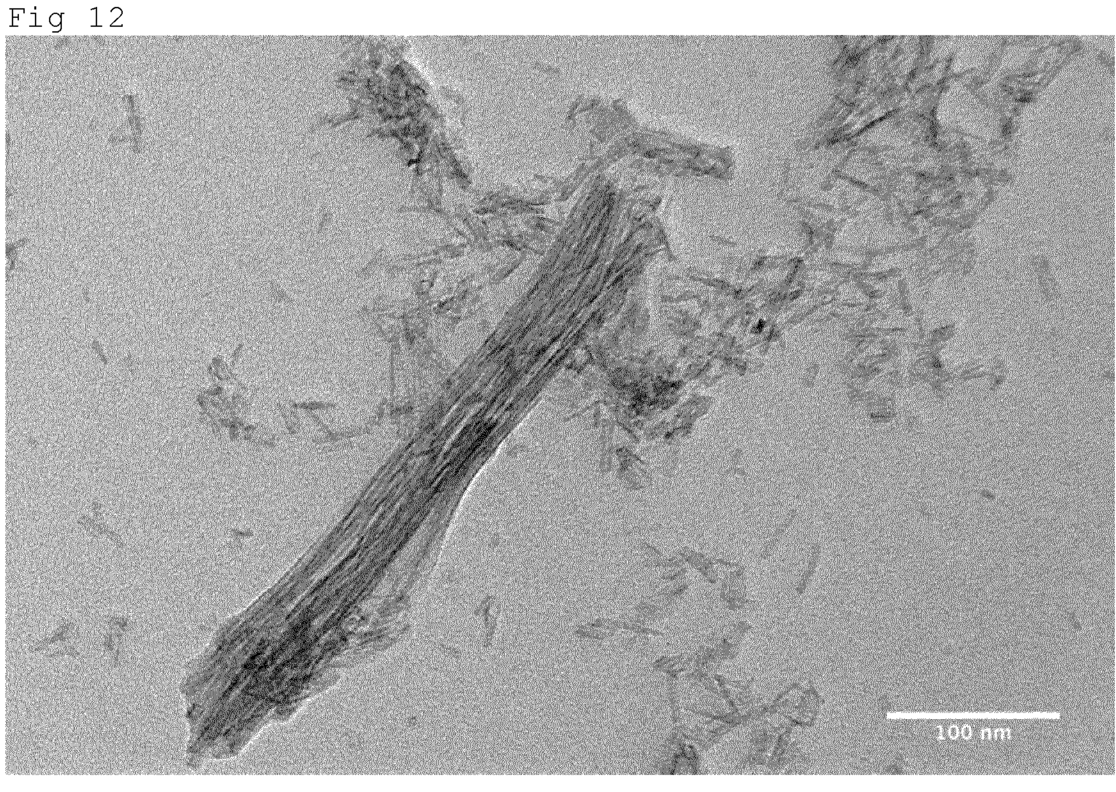
FIG. 12 shows a TEM image of sample RWC-1-017, with well formed long tubes forming an aggregate of parallel tubes, surrounded by shorter pieces of tubes, many likely broken during the grinding and sonication used in sample preparation.

FIG. 12 shows a TEM image of sample RWC-1-017, with well formed long tubes forming an aggregate of parallel tubes, surrounded by shorter pieces of tubes, many likely broken during the grinding and sonication used in sample preparation. The tubes are clearly hollow here, with outer diameters of approximately 5 nm, inner diameters of the order of 1.5-2.0 nm and wall thicknesses of approximately 1.5 nm. The inner and outer tube diameters of typical tubes obtained after step e) are 1.5-8 nm and 5-10 nm, respectively.

Figure 13:
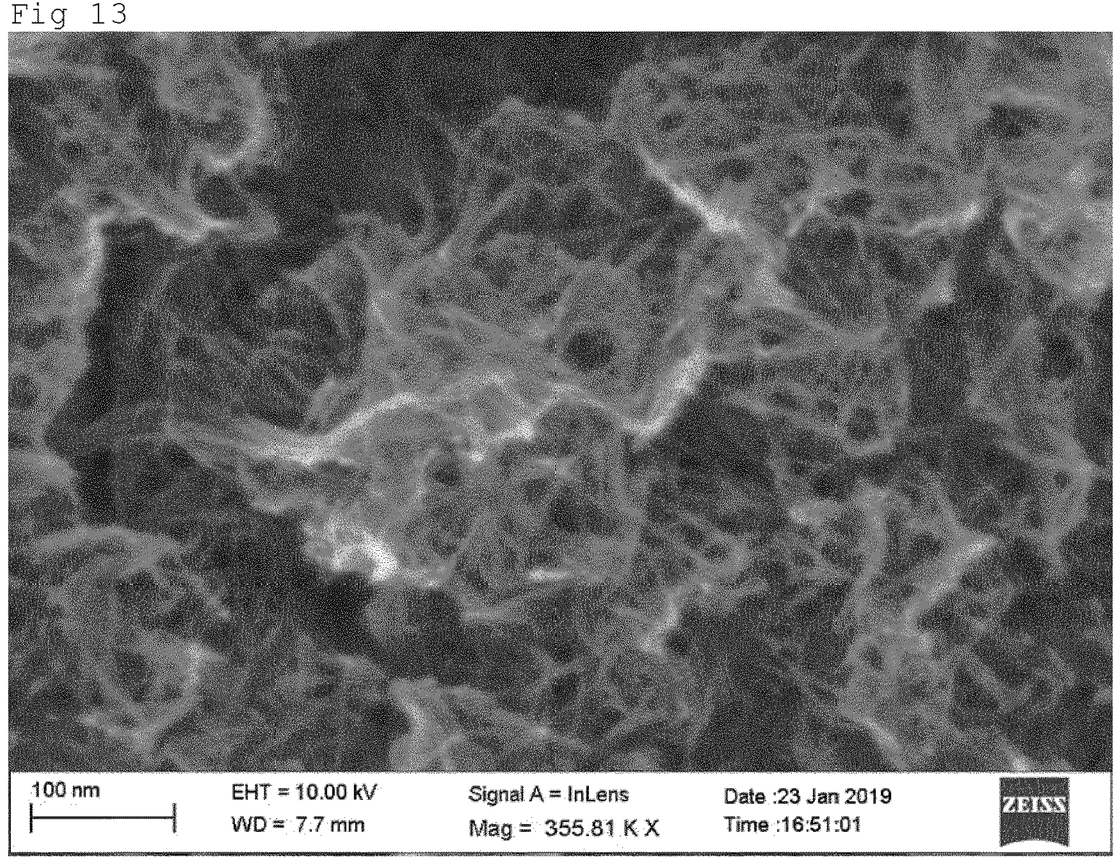
FIG. 13 shows an SEM image of sample RWC-1-018, with well-formed elongate, curved and twisted tubes/rods forming an aggregated porous solid.

FIG. 13 shows an SEM image of sample RWC-1-018 obtained after step e) and heating at 110° C., with well-formed elongate, curved and twisted tubes/rods forming an aggregated porous solid. The nitrogen physisorption experiment performed on this sample revealed a mesopore volume of approximately 0.6-0.65 $cm^3 \cdot g^1$ and a tight mesopore size distribution on adsorption and desorption centered near 8 nm, illustrating that this aggregated assembly of tubes was likely homogeneous on the macroscopic scale and that the aggregated structure forms mesoporous solid with a well defined and accessible internal mesopore system.

Figure 14:
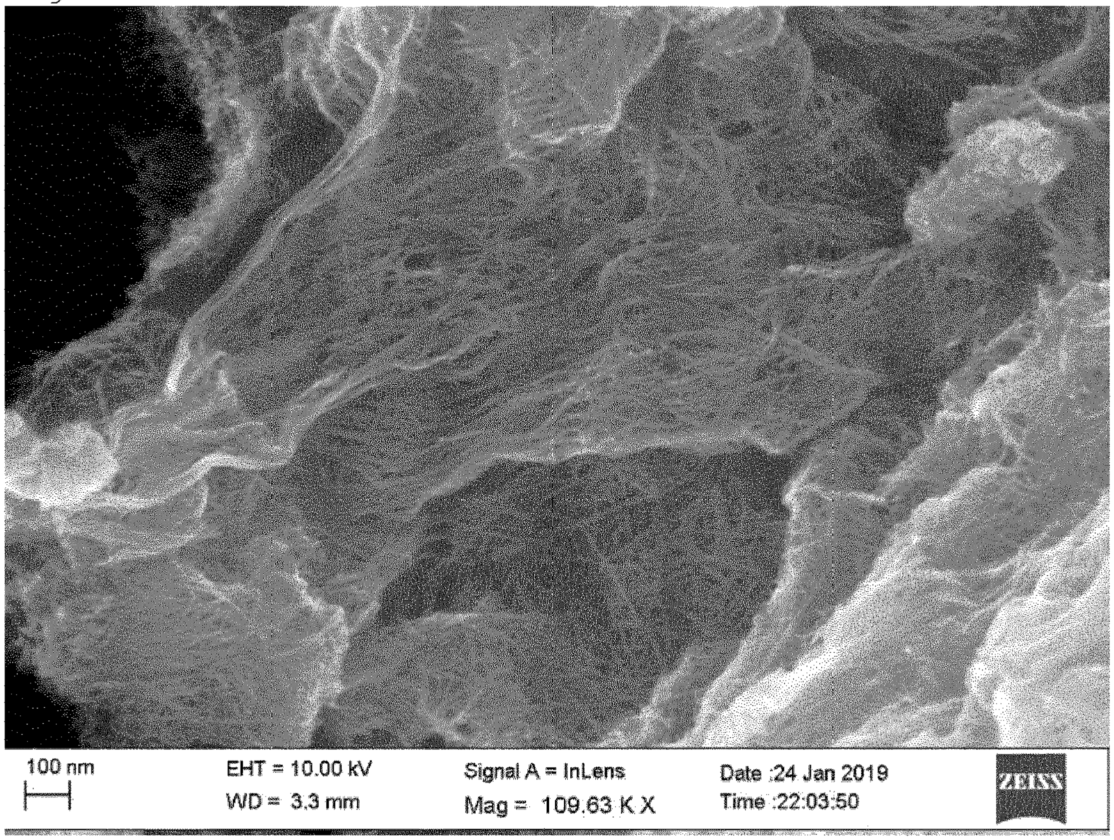
FIG. 14 shows an SEM image of sample RWC-1-020, with well-formed elongate, curved and twisted tubes/rods forming an aggregated porous solid.

FIG. 14 shows an SEM image of sample RWC-1-020 obtained after step e) and heating at 110° C., with well-formed elongate, curved and twisted tubes/rods forming an aggregated porous solid.

Figure 15:
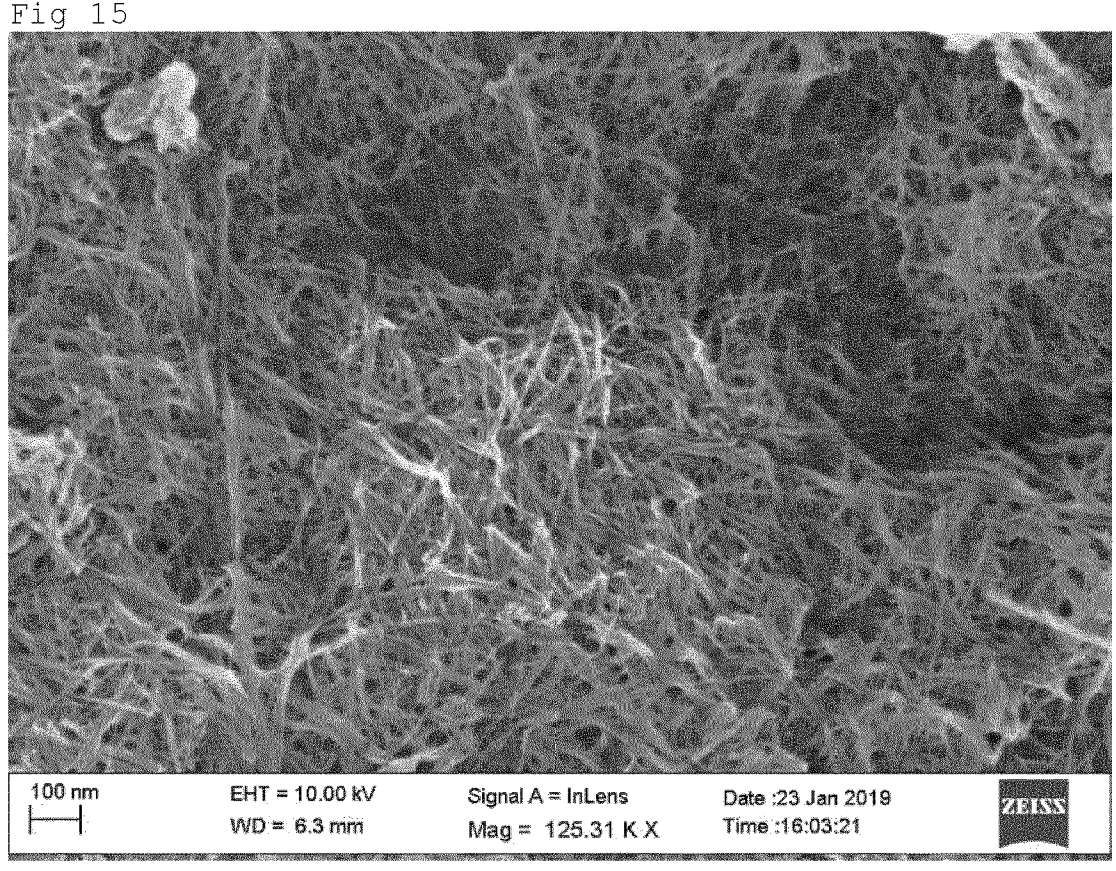
FIG. 15 shows an SEM image of sample RWC-1-024, with well-formed elongate, curved and twisted tubes/ribbons forming an aggregated porous solid.

FIG. 15 shows an SEM image of sample RWC-1-024 obtained after step e) and heating at 110° C., with well-formed elongate, curved and twisted tubes/ribbons forming an aggregated porous solid.

Figure 16:
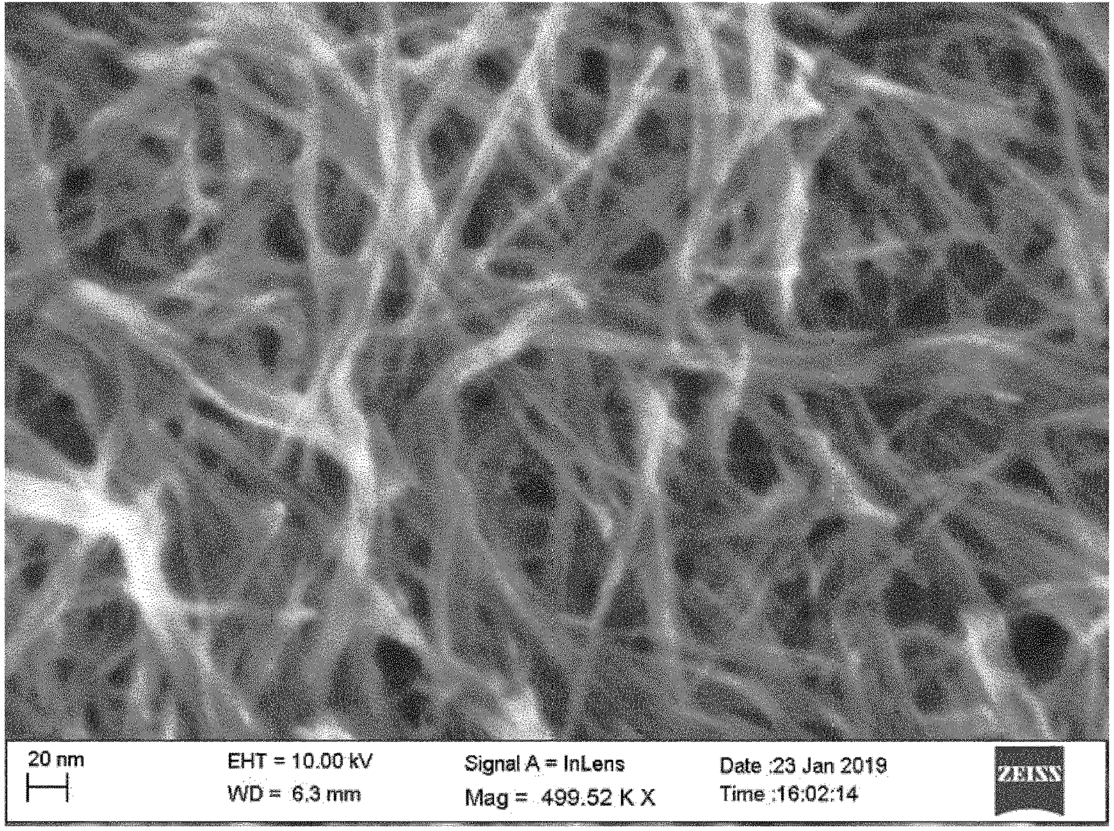
FIG. 16 shows a zoomed in view of the SEM image of sample RWC-1-024 seen in FIG. 14, clearly showing the diameter of individual tubes/ribbons as approximately 3-8 nm.

FIG. 16 shows a zoomed in view of the SEM image of sample RWC-1-024 obtained after step e) and heating at 110° C., seen in FIG. 14, clearly showing the diameter of individual tubes/ribbons as approximately 3-8 nm.

Figure 17:
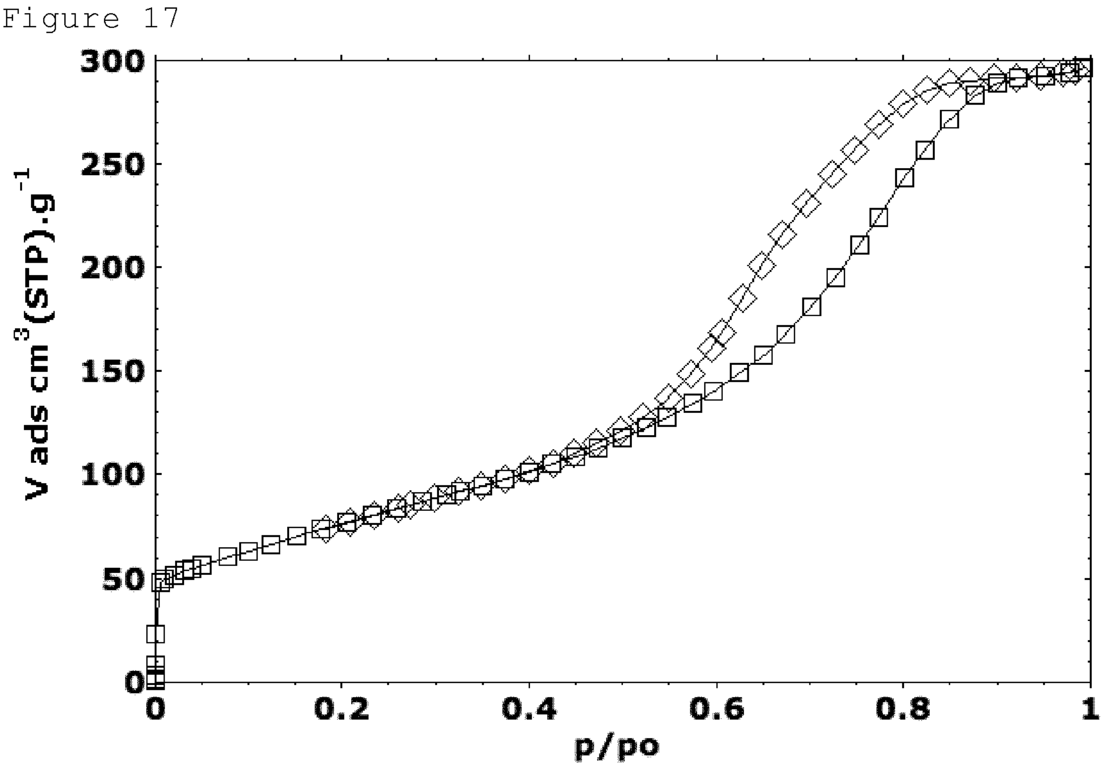
FIG. 17 shows the adsorption (squares) and desorption (diamonds) branches of the nitrogen physisorption isotherm at 77 K corresponding to JAT-1-017 of Tables 1 and 2.

FIG. 17 shows the adsorption (squares) and desorption (diamonds) branches of the nitrogen physisorption isotherm at 77 K corresponding to JAT-1-017 after step f) of Tables 1 and 2.

Figure 18:
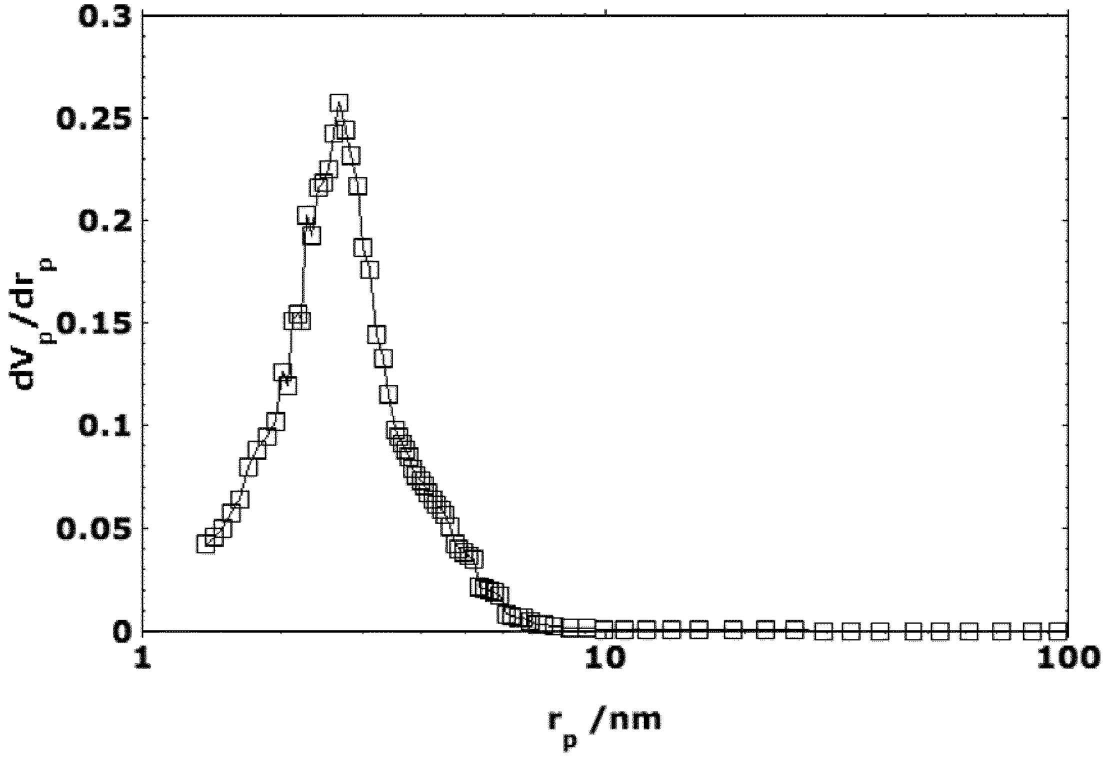
FIG. 18 shows the BJH desorption pore size distribution derived from the desorption branch of FIG. 17.
Figure 19:
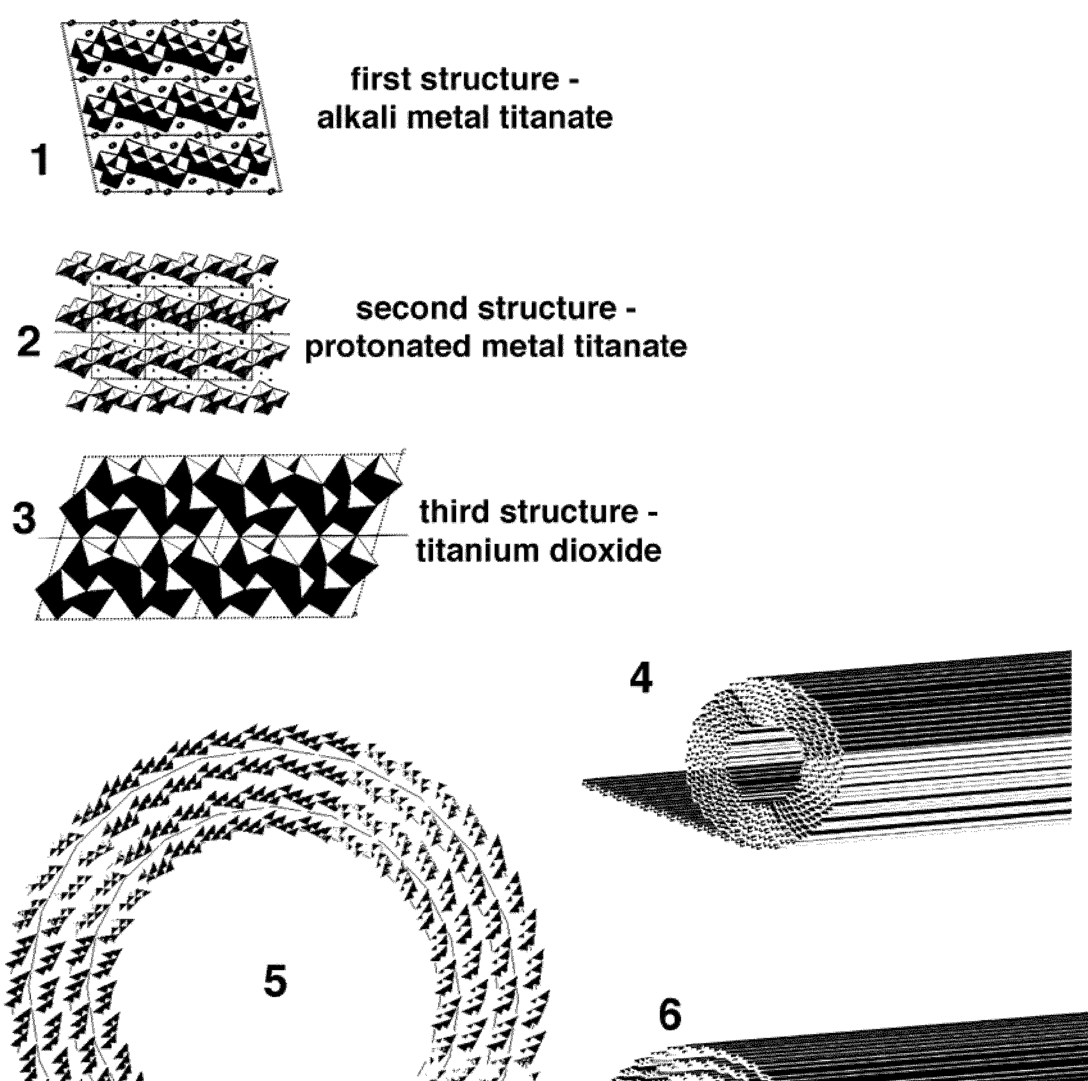
FIG. 19 shows crystal structures comprising $TiO_6$ octahedra described herein, namely the first, second and third structures) (1-3), and a single layer of the second structure rolled into a tube (4-6).

FIG. 18 shows the BJH desorption pore size distribution derived from the desorption branch of FIG. 17. The inner hollow space of the tubes can be considered as a long cylindrical pore. The peak in the pore size distribution at 3.4 nm is interpreted as the mean inner pore radius of the tubes, corresponding to an inner pore diameter of 6.8 nm. The pore volume in pores corresponding $p/p_0$ approximately 0.99 for this sample was 0.4625 $cm^3 \cdot g^{-1}$. The BJH pore sizes determined by nitrogen physisorption Table 1 shows conditions for the examples.

Table 2 shows results from the examples.

TABLE 1

| Input conditions | | | | | | |
|---|---|---|---|---|---|---|
| Exp # | Temperature | mass TiO2 sol | % TiO2 in sol | mass TiO2 | heating time | OH molarity |
| RWC-1-005 | 120 | 1.200 | 15 | 0.180 | 19 | 9.9 |
| RWC-1-006 | 90 | 2.520 | 15 | 0.378 | 18 | 9.9 |
| RWC-1-007 | 98 | 4.800 | 15 | 0.720 | 19 | 9.9 |
| RWC-1-008 | 130 | 2.470 | 15 | 0.371 | 16 | 9.2 |
| RWC-1-009 | 130 | 2.400 | 30 | 0.720 | 24 | 9.8 |
| RWC-1-010 | 100 | 2.400 | 30 | 0.720 | 24 | 9.8 |
| RWC-1-011 | 100 | 2.400 | 30 | 0.720 | 24 | 10.2 |
| RWC-1-012 | 130 | 2.400 | 30 | 0.720 | 20 | 9.8 |
| RWC-1-013 | 130 | 4.800 | 15 | 0.720 | 70 | 8.1 |
| RWC-1-014 | 130 | 1.200 | 30 | 0.360 | 46 | 10.2 |
| RWC-1-015 | 100 | 1.200 | 30 | 0.360 | 46 | 10.5 |
| RWC-1-016 | 100 | 2.400 | 30 | 0.720 | 46 | 10.2 |
| RWC-1-017 | 145 | 2.400 | 15 | 0.360 | 47 | 9.2 |
| RWC-1-018 | 100 | 2.400 | 30 | 0.720 | 46 | 10.2 |
| RWC-1-019 | 100 | 9.600 | 15 | 1.440 | 46 | 8.1 |
| RWC-1-020 | 145 | 1.501 | 30 | 0.450 | 22 | 10.2 |
| RWC-1-021 | 145 | 3.200 | 15 | 0.480 | 19 | 9.2 |
| RWC-1-022 | 145 | 2.480 | 37 | 0.918 | 27 | 10.4 |
| RWC-1-023 | 145 | 2.457 | 37 | 0.909 | 27 | 10.4 |
| RWC-1-024 | 145 | 2.426 | 15 | 0.364 | 27 | 9.4 |
| RWC-1-026 | 130 | 2.400 | 15 | 0.360 | 19 | 9.9 |
| RWC-1-027 | 130 | 2.420 | 15 | 0.363 | 19 | 9.9 |
| RWC-1-028 | 162 | 2.480 | 37 | 0.918 | 18 | 10.5 |
| RWC-1-029 | 162 | 2.964 | 30 | 0.889 | 18 | 10.2 |
| JAT-1-002 | 130 | 1.210 | 15 | 0.182 | 22 | 10.1 |
| JAT-1-003 | 130 | 1.220 | 15 | 0.183 | 7 | 10.1 |
| JAT-1-004 | 130 | 1.210 | 15 | 0.182 | 7 | 10.1 |
| JAT-1-005 | 130 | 1.210 | 15 | 0.182 | 7 | 10.1 |
| JAT-1-006 | 130 | 1.221 | 15 | 0.183 | 22 | 10.1 |
| JAT-1-007 | 130 | 2.447 | 15 | 0.367 | 22 | 9.2 |
| JAT-1-008 | 130 | 6.004 | 15 | 0.901 | 22 | 7.7 |
| JAT-1-009 | 130 | 8.406 | 15 | 1.261 | 22 | 6.9 |
| JAT-1-010 | 130 | 1.215 | 15 | 0.182 | 20 | 3.8 |
| JAT-1-011 | 130 | 1.219 | 15 | 0.183 | 20 | 5.8 |
| JAT-1-012 | 130 | 1.245 | 15 | 0.187 | 20 | 7.7 |
| JAT-1-013 | 130 | 1.219 | 15 | 0.183 | 20 | 16.5 |

TABLE 1-continued

| Exp # | Temper-ature | mass TiO2 sol | % TiO2 in sol | mass TiO2 | heating time | OH molarity |
|---|---|---|---|---|---|---|
| | Input conditions | | | | | |
| JAT-1-015 | 115 | 1.202 | 15 | 0.180 | 8 | 9.9 |
| JAT-1-016 | 115 | 1.222 | 15 | 0.183 | 24 | 9.9 |
| JAT-1-017 | 115 | 1.219 | 15 | 0.183 | 36 | 9.9 |
| JAT-1-018 | 130 | 6.000 | 20 | 1.200 | 24 | 7.4 |
| JAT-1-019 | 130 | 0.477 | 40 | 0.191 | 24 | 10.5 |
| JAT-1-021 | 130 | 12.070 | 15 | 1.811 | 24 | 9.9 |

TABLE 2

| Exp # | EM texture | texture length nm | EDX Ti | EDX Na | BET S.A. $m^2/g$ | XRD phase 110° C. | XRD phase 350° C. | XRD d(200) 350° C. peak area | XRD d(200) 350° C. peak width s.d. |
|---|---|---|---|---|---|---|---|---|---|
| | Results | | | | | | | | |
| RWC-1-005 | tubes to well formed tubes | 25-250 | 24.15 | 7.05 | | titanate | titanate/ TiO2(B) | | |
| RWC-1-006 | open tubes to sheets | 50-200 | 15.51 | 14.53 | | titanate | titanate/ TiO2(B) | | |
| RWC-1-007 | tubes to open tubes | 50-200 | 21.12 | 8.42 | | titanate | titanate/ TiO2(B) | | |
| RWC-1-008 | tubes. open tubes and curled sheets | 50-200 | 16.09 | 15.73 | | titanate | titanate/ TiO2(B) | | |
| RWC-1-009 | tubes to open tubes and sheets | 100-200 | 28.86 | 11.46 | | titanate | titanate/ TiO2(B) | 69.3 | 1.33 |
| RWC-1-010 | tubes to sheets | 100-200 | | | | titanate | titanate/ TiO2(B) | 43.8 | 1.56 |
| RWC-1-011 | tubes to sheets | 25-50 | 46.6 | 7.82 | | titanate | titanate/ TiO2(B) | 56.3 | 1.49 |
| RWC-1-012 | tubes or rods | 25-100 | 24.74 | 6.55 | 172 | titanate | titanate/ TiO2(B) | 65.9 | 1.4 |
| RWC-1-013 | tubes to curved sheets | 25-100 | 22.9 | 10.5 | 117 | titanate | titanate/ TiO2(B) | 70.2 | 1.4 |
| RWC-1-014 | tubes to open tubes and curved sheets | 25-50 | 22 | 7 | 221 | titanate | titanate/ TiO2(B) | 52.9 | 1.37 |
| RWC-1-015 | sheets with curled edges to open tubes | 25-100 | 21.2 | 12.17 | | titanate | titanate/ TiO2(B) | 74 | 1.75 |
| RWC-1-016 | tubes to sheets with curled edges | 25-50 | 18 | 10.8 | | titanate | titanate/ TiO2(B) | 52.4 | 1.57 |
| RWC-1-017 | tubes | 50-200 | 27.84 | 0.38 | 289 | titanate | titanate/ TiO2(B) | 14.4 | 2.83 |
| RWC-1-018 | tubes to ribbons of tubes | 25-300 | 19.82 | 0.9 | 284 | titanate | titanate/ TiO2(B) | 27.7 | 2.98 |
| RWC-1-019 | short tubes to curled sheets | 10-100 | 23.47 | 3.64 | 197 | titanate | titanate/ TiO2 anatase | 32.3 | 2.98 |
| RWC-1-020 | tubes | 50-250 | 23.04 | 6.34 | 237 | titanate | titanate/ TiO2(B) | 49 | 1.26 |
| RWC-1-021 | tubes to well formed tubes | 25-100 | 21.88 | 0.09 | | titanate | titanate/ TiO2(B) | 16.7 | 2.21 |
| RWC-1-022 | tubes to open tubes | 50-150 | 28.12 | 4.49 | 291 | titanate | titanate/ TiO2(B) | 33.5 | 2.07 |
| RWC-1-023 | tubes to well formed tubes | 50-200 | 29.68 | 3.3 | | titanate | titanate/ TiO2(B) | 44.1 | 1.47 |
| RWC-1-024 | well formed tubes to open tubes | 50-1000 | 22.05 | 0.14 | 282 | titanate | titanate/ TiO2(B) | 15.8 | 2.14 |
| RWC-1-026 | tubes to open tubes and sheets | 50-100 | 25.31 | 0.94 | | titanate | Titanate/ TiO2(B) | | |
| RWC-1-027 | tubes to open tubes and sheets | 50-100 | 23.78 | 0.05 | | titanate | titanate/ TiO2(B) | | |
| JAT-1-002 | tubes | 90-130 | | | | titanate | | | |
| JAT-1-003 | short tubes | 30-50 | | | | titanate | | | |
| JAT-1-004 | short tubes | 30-50 | | | | titanate | | | |
| JAT-1-005 | tubes or wires | 30 | | | | titanate | | | |
| JAT-1-006 | Sheets and ribbons/ tubes | 20-30 | | | | amorphous | | | |
| JAT-1-007 | | | | | | titanate | | | |
| JAT-1-008 | | | | | | titanate | | | |
| JAT-1-009 | | | | | | titanate | | | |
| JAT-1-010 | Sheets | | | | | titanate | | | |
| JAT-1-011 | Sheets | | | | | titanate | | | |

TABLE 2-continued

| Results | | | | | | | | | |
|---|---|---|---|---|---|---|---|---|---|
| Exp # | EM texture | texture length nm | EDX Ti | EDX Na | BET S.A. $m^2/g$ | XRD phase 110° C. | XRD phase 350° C. | XRD d(200) 350° C. peak area | XRD d(200) 350° C. peak width s.d. |
| JAT-1-012 | Sheets | | | | | titanate | | | |
| JAT-1-013 | Sheets | | | | | amorphous | | | |
| JAT-1-015 | | | | | | titanate | | | |
| JAT-1-016 | Mixture of sheets and short tubes | 20-40 | | | | titanate | | | |
| JAT-1-017 | tubes | 90-130 | | | | titanate | | | |
| JAT-1-018 | mainly sheets. Some tubes | 20 | | | | | | | |
| JAT-1-019 | Very long tubes 200-1000 nm in bundles | 200-1000 | | | | | | | |
| JAT-1-021 | Agglomerated tubes or ribbons | 100-500 | | | | | | | |

Example 13

A battery anode was prepared by using material according to the invention.

The material was synthesized according to the following with following masses:

$TiO_2$ was provided as a 37 wt % dispersion of particles, corresponding to 5.2773 g $TiO_2$.

Total 10 M KOH 130.56 g was added to adjust the concentration of hydroxide ions to well above 8 M.

The mixture stirred for 1 hour using a magnetic stirrer. Subsequently the mixture was divided evenly between 4 Teflon® (polytetraflouroethene) lined autoclaves and then heated for 56 hours at 145° C. with no stirring.

After 56 hours of heating, the autoclaves were cooled ambiently to room temperature in the closed oven for 23 hours. The product in each Teflon® liner were mixed together.

To this was added 0.1 M HCl and allowed to settle, decanting the clear supernatant. This was done repeated three times. After this an excess of 0.1 M HCl was mixed with the decanted product and filtered. By this procedure at least a part of the $K^+$-ions were replaced by $H^+$-ions.

The sample was then filtered slowly over several days, washing with milliQ water until pH>3. The sample was then air-dried. The air-dried sample was then heated in a ceramic dishes in air as follows:

A first heating to a temperature below 300° C. to remove water followed by 350° C. for 1.5 hours plus 400° C. for 30 min to convert to third structures comprising $TiO_2$.

Raman was used on a split from this sample to limit the temp and time so anatase was minimized.

The heat-treated sample was then ground in a mortar and pestle to a fine consistency.

Anode Preparation

A dispersion was made with the material as follows:

Samples were prepared using 1.0028 g third structure comprising $TiO_2$ 0.125 g Super C 65 carbon black (Imerys®)

0.125 g Kynar® PVDF (polyvinylidene fluoride).

2.38 g n-methylpyrrolidone (NMP)

All slurries were homogenised using a RETCH Mixer Mill MM 200 with stainless steel jars.

First the carbon black was dispersed in a 5 wt % PVDF solution for 10 min. Afterwards the active material and additional NMP was added and the slurry was homogenised for 30 min.

The slurries were coated using a K control coater with a meter bar designed to leave a wet film deposit of 100 μm.

After coating the electrode sheets were dried at 60° C., roll pressed and dried again at 100° C. under vacuum for 10 hours. 12 mm Ø electrodes were punched and transferred to an Ar filled glovebox.

2016 coin-cells (6 cells per sample) were assembled using Li as counter electrode a Celgard 2400 PP separator and 40 μL LP40 electrolyte (1M $LiPF_6$ in EC/DEC 1:1 wt.)

Electrochemical Characterisation

Electrochemical charge and discharge experiments were carried out on a Maccor 4200 and a LANHE CT2001A in a voltage window of 1-2.5 V vs. $Li/Li^+$. 1 C was defined as 330 mA/g ($TiO_2$).

Two different test programs were applied.

In the first program, the rate acceptance was assessed. The cells were charged and discharge at C/10, C/3, C/2, 1C, 2 C, 5 C, 10 C and C/10 again for 5 cycles each. The last step at low currents was applied to analysed the capacity recovery.

In the second program, the cycle-life at 3 C was assessed for 500 cycles. Prior to the cycle life analysis the cells underwent 3 cycles at a low current of C/10.

Electrochemical Results

All results are given in mAh per gram $TiO_2$. The coulombic efficiency is calculated by dividing the delithiation capacity by the lithiation capacity.

The lowest applied current was 33 mA/g (C/10) and the highest 3300 mA/g (10 C). This would translate to about 20 C for LTO.

Figure 20:
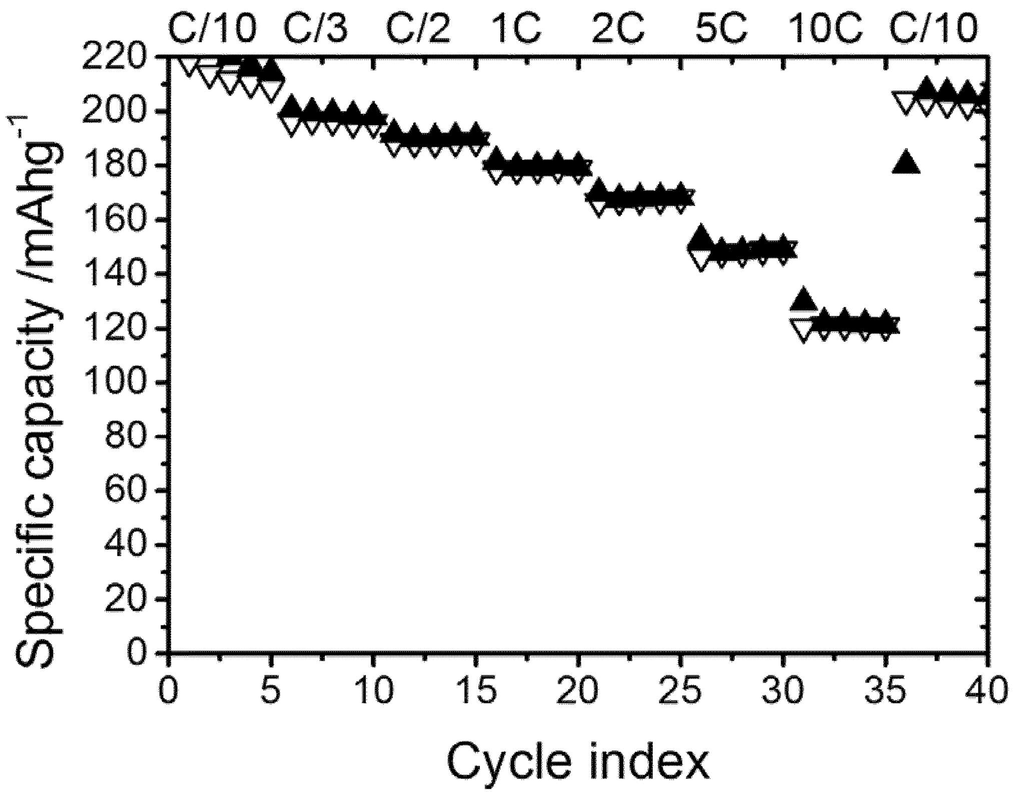
FIG. 20 shows the specific capacity versus the number of charging and discharging cycles according to example 13.

A diagram from a test cycle is shown in FIG. 20.

Initial capacity at C/10 cycle 3: 215 mAh/g

Capacity at 5 C (cycle 30): 150 mAh/g

Capacity at 10 C (cycle 35): 125 mAh/g

Recovered capacity: 210 mAh/g

Capacity after 500 cycles at 3 C: 130 mAh/g (160 mAh/g initial)

Coulombic efficiency in both tests: converged to >99.5% after initial cycling.

The invention claimed is:

1. A method for manufacturing a structure of a titanium compound selected from the group consisting of sheets, wires and tubes, the method comprising ab) providing a dispersion of particles comprising $TiO_2$, wherein the average diameter of the particles in the dispersion is 3-20 nm, and wherein the dispersion comprises citric acid, wherein the dispersion after step ab) comprises at least 15 wt % $TiO_2$, c) adjusting the concentration of hydroxide ions in the dispersion from step ab) to at least 8 M by adding an alkali metal hydroxide MOH, d) treating the dispersion from step c) at a temperature in the interval 90-170° C. during 6-72 hours to obtain a plurality of first structures comprising alkali metal titanate, and e) treating the plurality of first structures comprising alkali metal titanate to exchange at least a part of the alkali metal ions $M^+$ with $H^+$ to obtain a plurality of second structures comprising protonated titanate.

2. The method according to claim 1, further comprising, after step ab) and before step c), the steps of:

b1) decreasing the content of ions in the dispersion such that the ion concentration is lowered to a point where a sol is formed, wherein the average diameter of the particles in the sol is 3-20 nm; and b2) adjusting the concentration of $TiO_2$ in the dispersion preferably to a value within the range of 20-70%.

3. The method according to claim 2, wherein the pH of the sol resulting from steps b1) and b2) is adjusted to a value in the range 0.5-1.5.

4. The method according to claim 1, wherein the plurality of second structures comprising protonated titanate obtained after step e) are heated to a temperature in the range 300-700° C. to obtain a plurality of third structures comprising titanium dioxide.

5. The method according to claim 4, wherein the plurality of second structures comprising protonated titanate obtained after step e) are heated as long as titanium dioxide in anatase form is not formed as measured by Raman spectroscopy.

6. The method according to claim 4, wherein the plurality of second structures comprising protonated titanate obtained after step e) are heated for a period in the interval 0.5 to 10 hours.

7. The method according to claim 1, further comprising adding at least one alkanolamine with the citric acid of step ab).

8. The method according to claim 1, wherein stirring is performed during step d).

9. The method according to claim 1, wherein the concentration of hydroxide ions is adjusted in step c) using NaOH.

10. The method according to claim 1, wherein the plurality of first structures comprising alkali metal titanate are separated from the remaining liquid between steps d) and e).

11. The method according to claim 1, wherein the treatment of the dispersion in step d) is performed at autogenous pressure.

12. The method according to claim 1, wherein no transition metal ions except titanium are added.

* * * * *